(12) United States Patent
Pedersen et al.

(10) Patent No.: US 8,140,990 B2
(45) Date of Patent: Mar. 20, 2012

(54) USER INTERFACE VISUALIZATIONS

(75) Inventors: Elin R. Pedersen, Portola Valley, CA (US); Peter Hong, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/818,222

(22) Filed: Jun. 18, 2010

(65) Prior Publication Data

US 2010/0325568 A1   Dec. 23, 2010

Related U.S. Application Data

(60) Provisional application No. 61/269,089, filed on Jun. 19, 2009.

(51) Int. Cl.
*G06F 3/048* (2006.01)
*G06F 3/00* (2006.01)

(52) U.S. Cl. ........ 715/764; 715/765; 715/766; 715/767; 715/243; 715/204

(58) Field of Classification Search .................. 715/204, 715/234, 764–767
See application file for complete search history.

(56) References Cited

U.S. PATENT DOCUMENTS

| | | | |
|---|---|---|---|
| 6,577,330 B1 | 6/2003 | Tsuda et al. | |
| 6,938,218 B1 * | 8/2005 | Rosen | 715/850 |
| 7,979,879 B2 * | 7/2011 | Kazama et al. | 725/41 |
| 2002/0176636 A1 * | 11/2002 | Shefi | 382/285 |
| 2005/0204306 A1 | 9/2005 | Kawahara et al. | |
| 2006/0187204 A1 | 8/2006 | Yi et al. | |
| 2008/0062141 A1 | 3/2008 | Chandhri | |
| 2008/0129757 A1 * | 6/2008 | Tanaka et al. | 345/660 |
| 2008/0250344 A1 | 10/2008 | Yoshida | |
| 2009/0158214 A1 * | 6/2009 | Arnold et al. | 715/830 |

FOREIGN PATENT DOCUMENTS

| | | |
|---|---|---|
| JP | 11-065806 A | 3/1999 |
| KR | 20060093990 A | 8/2006 |

OTHER PUBLICATIONS

International Search Report and Written Opinion, PCT/US2010/038946, dated Feb. 28, 20011.

* cited by examiner

*Primary Examiner* — Tadeese Hailu
(74) *Attorney, Agent, or Firm* — Lerner, David, Littenberg, Krumholz & Mentlik, LLP

(57) ABSTRACT

Aspects of the invention pertain to user interface visualizations, enabling efficient display of content on a display device. At least some content is presented having diagonal views to emphasize certain portions of the content while deemphasizing other portions of the content.

7 Claims, 46 Drawing Sheets

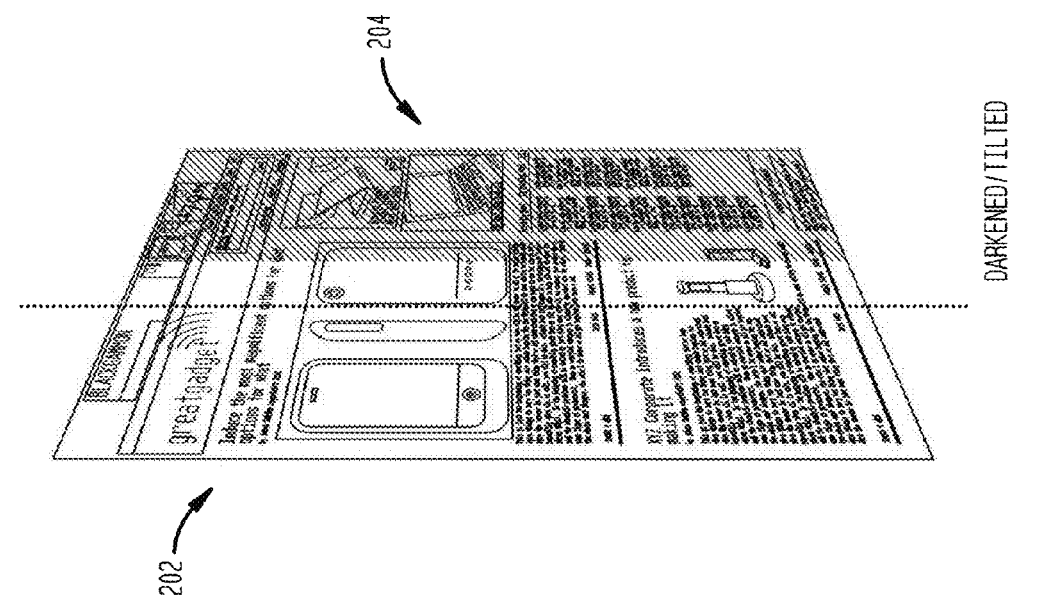
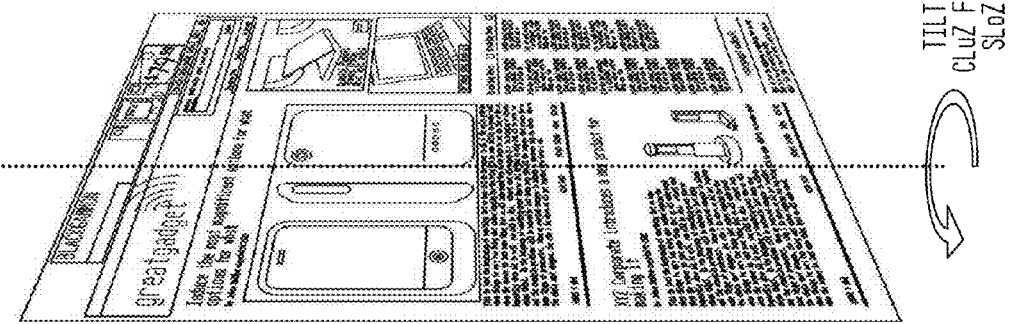

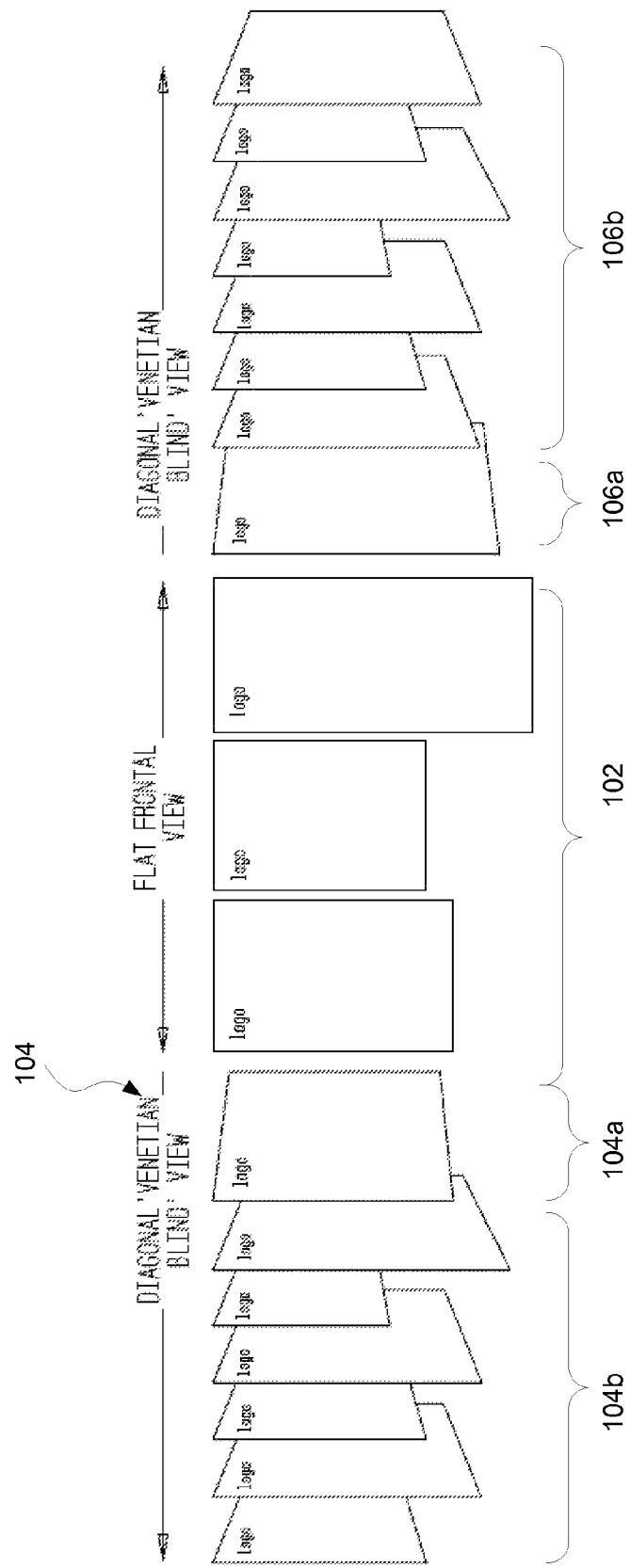

45°, 10px GAP 1.8x

STANDARD PREVIEW WIDTH

0°, 10px GAP

1x

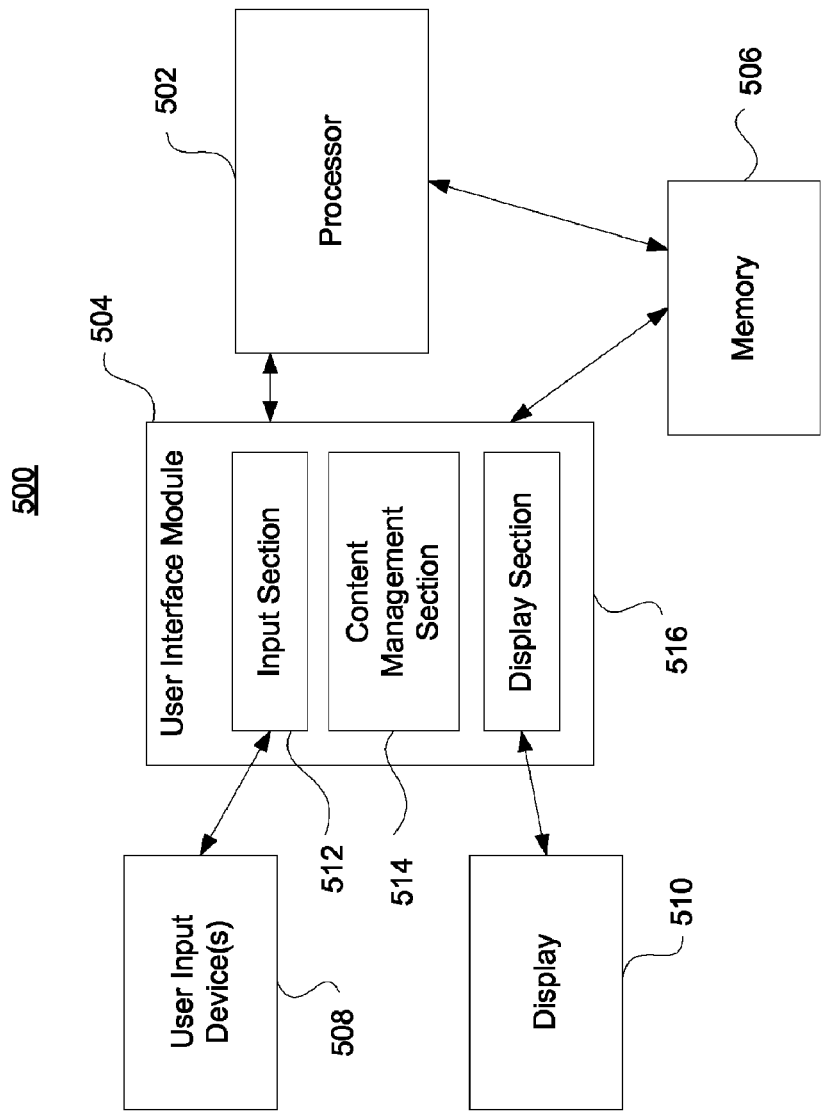

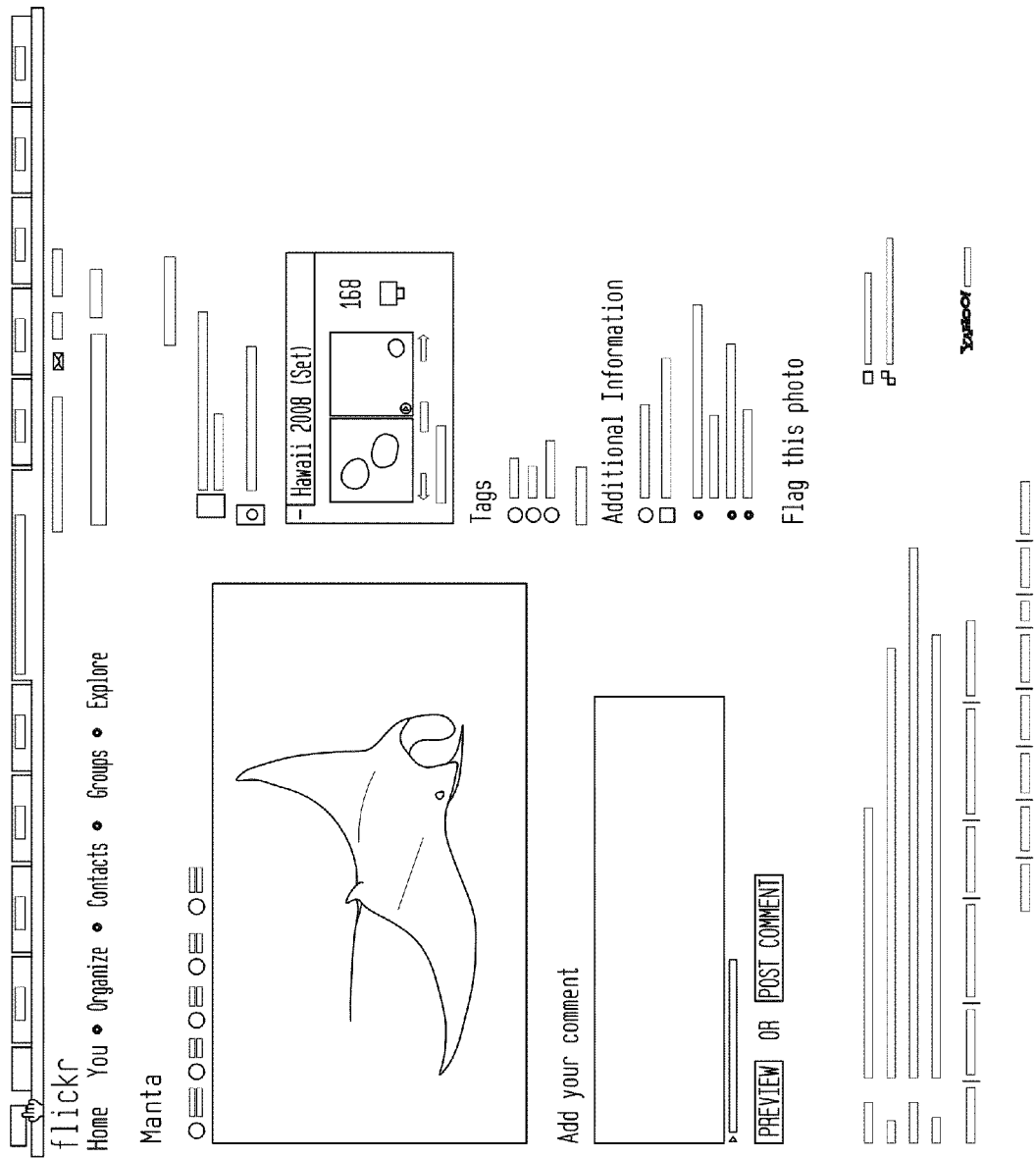

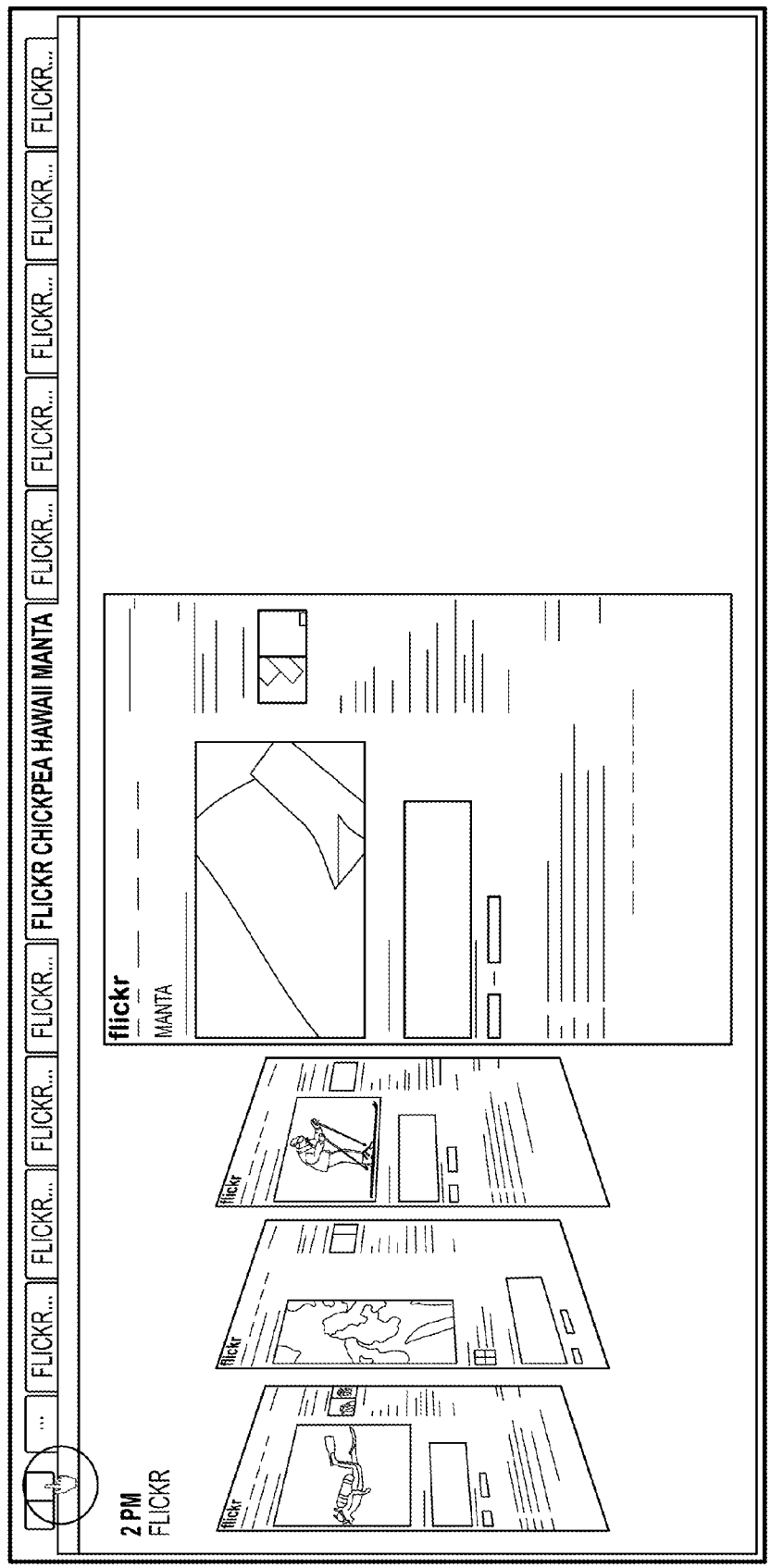

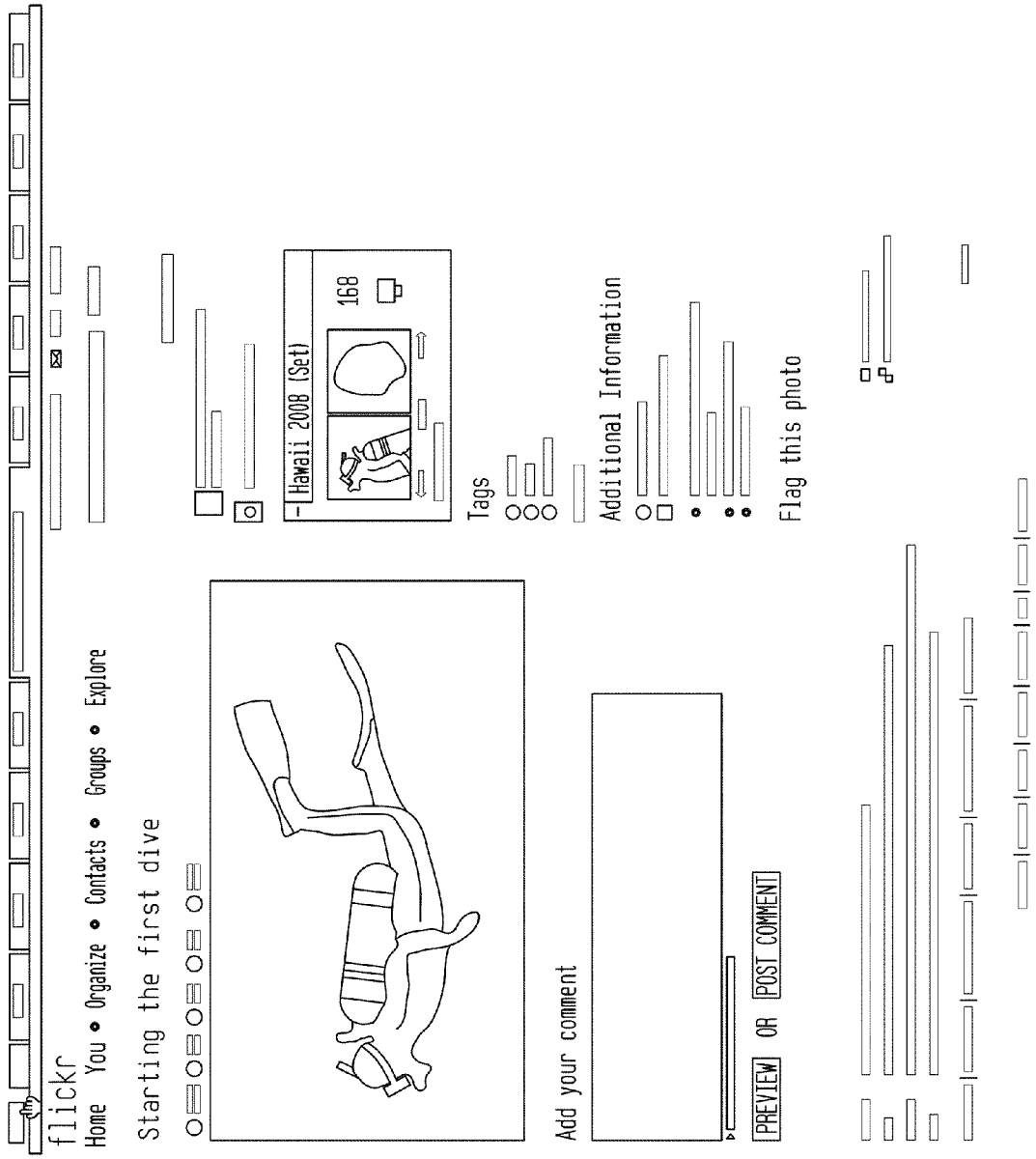

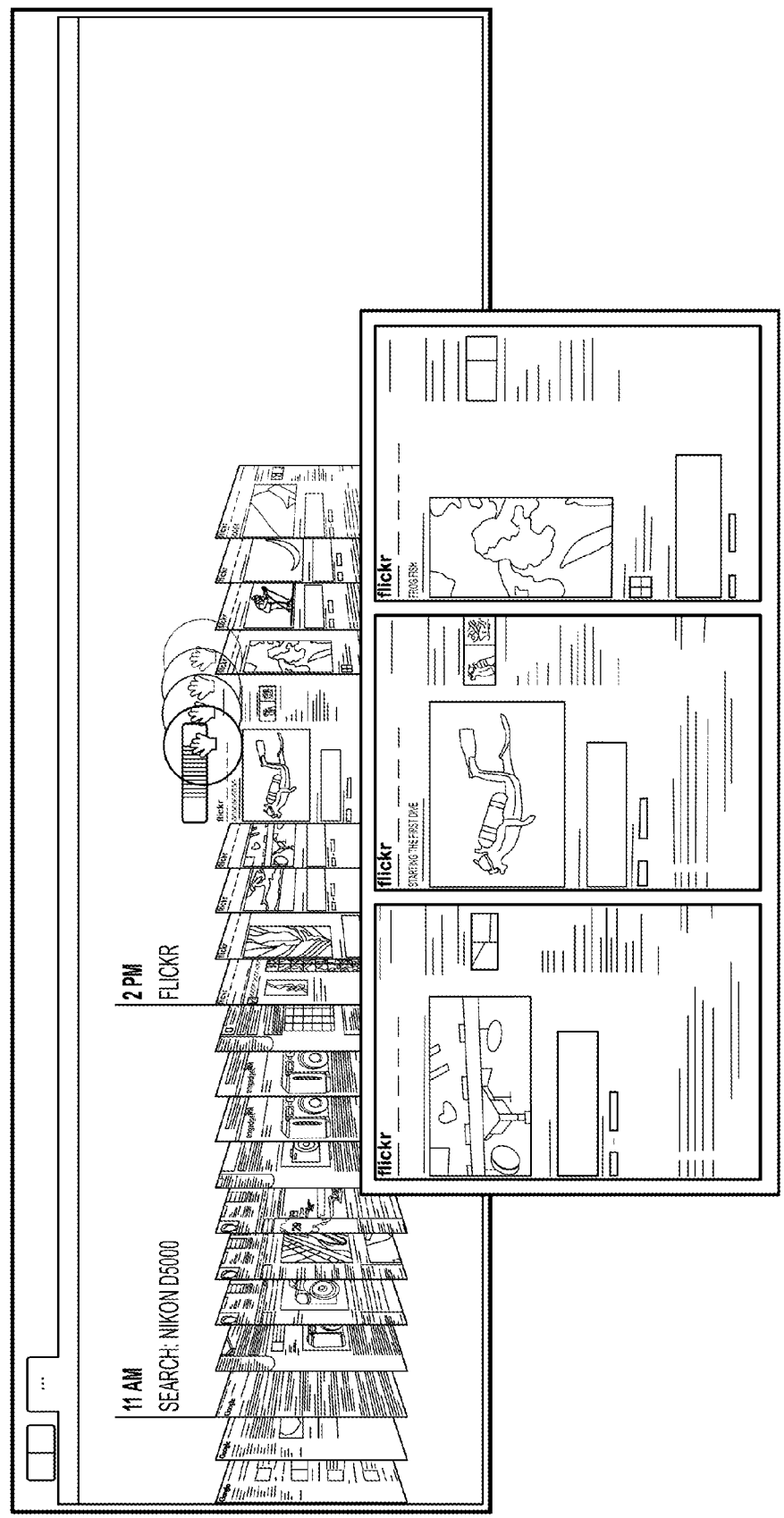

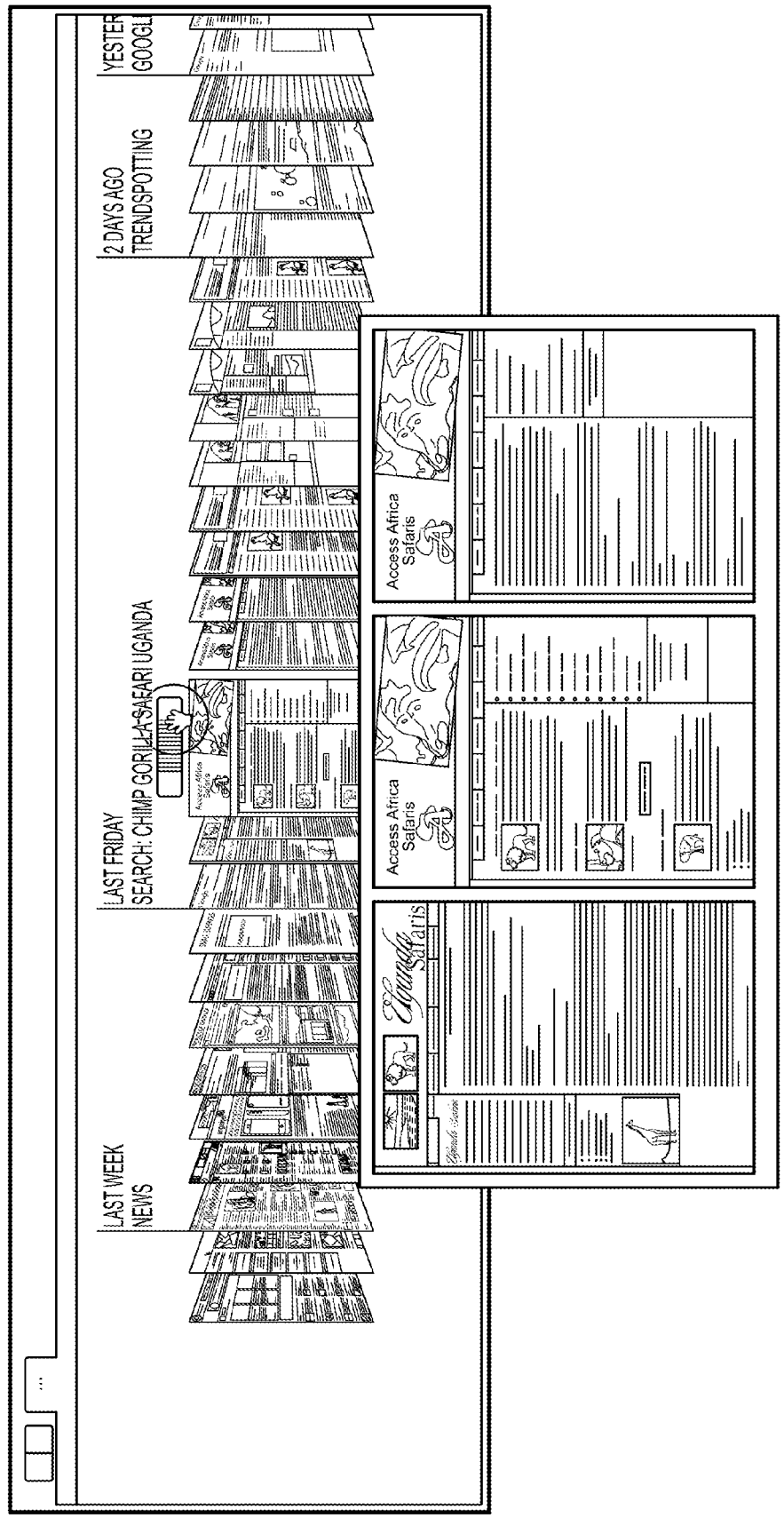

FIG. 15F

USER INTERFACE VISUALIZATIONS

CROSS-REFERENCE TO RELATED APPLICATIONS

This application claims the benefit of U.S. Provisional Application No. 61/269,089, entitled "User Interface Visualizations," filed Jun. 19, 2009, the entire disclosure of which, including the drawings and appendices, is hereby incorporated by reference.

BACKGROUND OF THE INVENTION

1. Field of the Invention

Aspects of the invention relate generally to user interfaces. More particularly, aspects are directed to user interface visualizations that provide core information when presenting multiple images in a single view.

2. Description of Related Art

Depending upon the application, a computer system user interface may present multiple items of interest simultaneously to a user. For instance, a graphical user interface may display a number of album or CD covers in a jukebox-type or carousel-type arrangement. FIG. 1 illustrates such a configuration. As shown, the layout 10 includes a central item of interest 12 and items of interest on the left (14) and right (16) sides. The left hand side items of interest 14 are angled to face inward toward the central item of interest 12. The right hand side items of interest 16 also are angled to face inward toward the central item of interest 12. Unfortunately, such configurations may conceal important elements of the items of interest.

Systems and methods which provide enhanced visualizations for multiple items in a single interface presentation are disclosed.

SUMMARY OF THE INVENTION

According to one embodiment of the invention, a content visualization method for use in a computer system comprises selecting electronic content for presentation on a display device; assigning a viewing axis for displaying the content; selecting a place of focus along the viewing axis; determining a content viewport, the content viewport setting an amount of the content viewable on the display device; constructing a content visualization to display at least a portion of the selected content on the display device; and displaying the content visualization on the display device based upon the content viewport, viewing axis and place of focus.

In one example, the viewing axis comprises a chronological representation of the selected electronic content. In another example, the viewing axis comprises a ranked list of the selected electronic content. In an alternative, the method further comprises re-constructing the content visualization based upon user feedback to the displayed content visualization.

In another example, the content visualization includes a plurality of sets of items of interest, a first one of the sets being arranged along a first portion of the display device and a second one of the sets being arranged adjacent to the first set, and wherein the first set is presented in full frontal format while the second set is presented in a diagonal view giving an appearance that the items in the second set are facing towards the items in the first set. In one alternative, the second set includes a first subset arranged adjacent to the first set and a second subset arranged adjacent to the first subset and remote from the first set, and wherein the first subset is presented having a transitional diagonal view. In one case, the transitional diagonal view of the first subset is between 5°-15° and the diagonal view of the second subset is at least 15°.

In another case, the transitional diagonal view is less than 15° and the diagonal view is on the order of 15°-45°.

In a further example, a third one of the plurality of sets is arranged adjacent to the first set and opposite the second set, the third set being presented in the diagonal view giving the appearance that the items in the third set are facing away from the items in the first set. Here, the third set may include a first subset arranged adjacent to the first set and a second subset arranged adjacent to the first subset of the third set and remote from the first set. In this case, the first subset of the third set is presented having a transitional diagonal view.

In another embodiment of the invention, a content visualization apparatus comprises memory for storing content visualization data and a processor operatively coupled to the memory. The processor is configured to select electronic content for presentation, assign a viewing axis for displaying the content, select a place of focus along the viewing axis, determine a content viewport, the content viewport setting an amount of the content that is viewable, and construct a content visualization to display at least a portion of the selected content on the display device. The apparatus also includes a display device operatively coupled to the processor. The display device is configured to display the content visualization based upon the content viewport, viewing axis and place of focus.

In one example, the viewing axis comprises a chronological representation of the selected electronic content. In another example, the viewing axis comprises a ranked list of the selected electronic content. In a further example, the processor is also configured to re-construct the content visualization based upon user feedback to the content visualization displayed on the display device.

In yet another example, the content visualization includes a plurality of sets of items of interest. Here, a first one of the sets is arranged along a first portion of the display device and a second one of the sets being arranged adjacent to the first set. The display device is configured to present the first set in full frontal format while the second set is presented in a diagonal view giving an appearance that the items in the second set are facing towards the items in the first set. In this case, the second set desirably includes a first subset arranged adjacent to the first set and a second subset arranged adjacent to the first subset and remote from the first set. The display device is configured to present the first subset having a transitional diagonal view.

In another embodiment of the invention, a content visualization system comprises a processor for processing application data for displaying on a display device and a user interface module managed by the processor. The user interface module includes an input section for storing selected content and a content management section for manipulating visualizations of the selected content. The selected content includes a plurality of items of interest. A given one of the visualizations includes a first one of the items of interest being arranged in full frontal format and second and third ones of the items of interest being arranged in a diagonal view. The second item is arranged in the diagonal view along one side of the first item and the third item is arranged in the diagonal view along the other side of the first item. The system also includes a display section for displaying the given visualization of the first, second and third items of interest on a display.

In one example, the content management section is operable to manipulate the visualizations by modifying an angle or tile of one or more pages of the first, second or third items of interest. In another example, the content management section is operable to manipulate the given visualization by emphasizing at least one critical layout or utility zone (CLuZ) of the selected content while deemphasizing at least one supplemental layout and optional zone (SLoz) of the selected content. In this case, the at least one CLuZ may be displayable at an angle toward a user. In one alternative, the at least one SLoZ is displayable at an angle away from the user. In another alternative, the at least one SLoZ is deemphasized by shading or graying thereof.

And in a further example, at least one of the second and third items includes a plurality of pages. Here, the diagonal view includes a full diagonal view and a transitional diagonal view. A first one of the plurality of pages is arranged in the full diagonal view while a second one of the plurality of pages is arranged in the transitional diagonal view between the first item and the first page.

BRIEF DESCRIPTION OF THE DRAWINGS

FIGS. 3A-F illustrate content visualizations emphasizing certain regions of interest within the content according to aspects of the invention.

FIG. 4 illustrates another graphical user interface visualization in accordance with aspects of the invention.

FIG. 10 illustrates a user interface system in accordance with aspects of the invention.

FIGS. 11A-I illustrate additional graphical user interface visualizations in accordance with aspects of the invention.

FIGS. 12A-G illustrate another set of graphical user interface visualizations in accordance with aspects of the invention.

And FIGS. 15A-F illustrate another set of graphical user interface visualizations in accordance with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Viewers of electronic content such as web pages are often faced with large quantities of information to consider. Individual items may be briefly scanned, with the viewer seeing only a few salient features of each item. The more content that is available, the more challenging it is to identify particular items of interest.

Aspects of the invention employ graphical representations for optimal browsing or presentation of structured, laid-out electronic information, such as web pages, to enable a user to parse and compare content quickly and efficiently. This is accomplished by consistently emphasizing the differently weighted visual characteristics of structured content. The user's attention is focused on more important parts of the content while minimizing distractions from less important areas.

Figure 2:
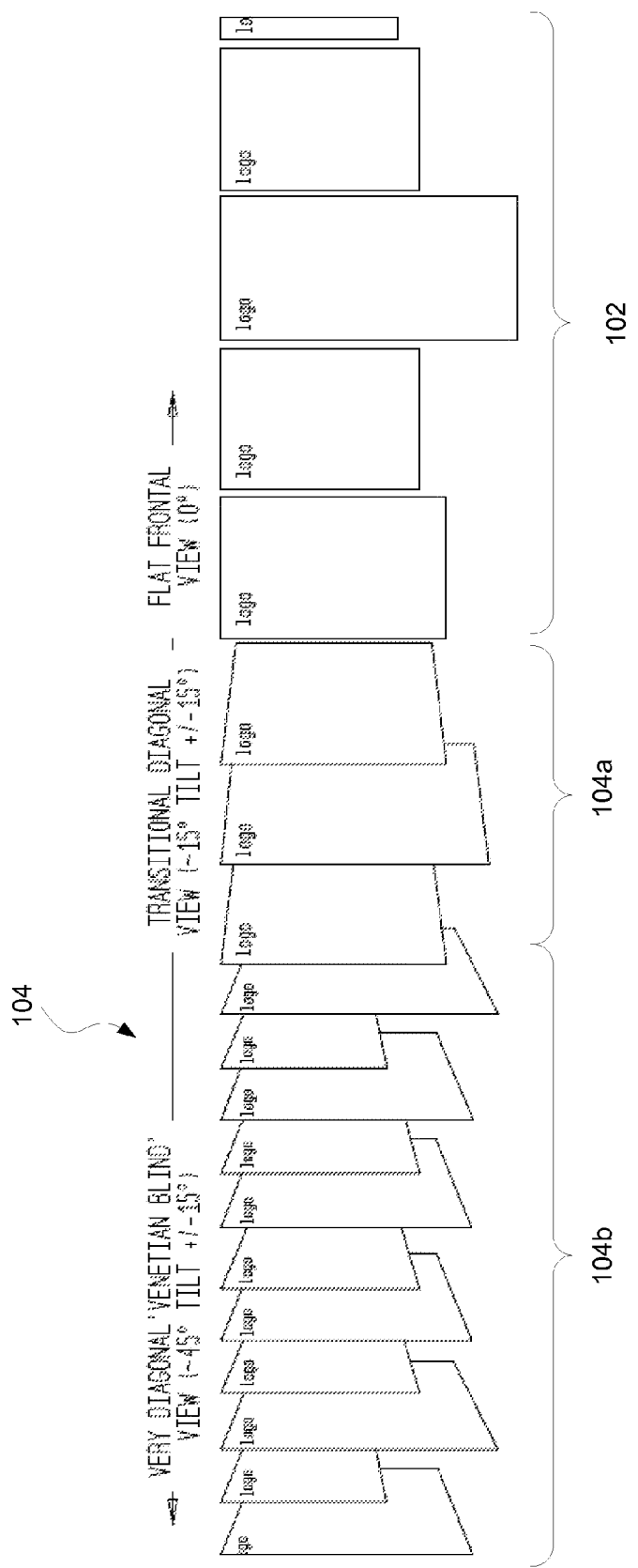
FIG. 2 illustrates a graphical user interface visualization in accordance with aspects of the invention.

FIG. 2 illustrates one embodiment of the invention in which a number of items of interest are presented in a linear arrangement 100. As shown, a set of primary items of interest 102 are arranged side by side in a planar or frontal configuration. In particular, each item in the set 102 is presented in a full frontal configuration with a 0° angle relative to the plane of the display.

A set of secondary items of interest 104 are arranged adjacent to the first set. Each item in the set 104 is presented with a diagonal (i.e., non-0°) view, giving the appearance that these items are turned to face the items in the set 102. The items in the first and second sets may be, for example, results from a user-directed search. The items in the sets 102 and 104 may be ordered chronologically, ranked according to likelihood of matching the search criteria, ranked according to recently viewed information, or other ordering techniques.

The second set 104 preferably includes a first subset 104a and a second subset 104b. As shown, the items of interest in the first subset 104a are presented at a first or "transitional" diagonal view. This transitional view may be tilted, for example, between 5°-15° relative to the 0° of the primary items of interest 102. The items of interest in the second subset 104b are presented with a second diagonal view greater than that of the first subset 104a. Thus, the second subset 104b may be tilted, for example, at an angle on the order of 15°-45°. While only two subsets are illustrated, any number of additional subsets may also be employed. Each item of interest in a given subset may be tilted at the same angle, or at different angles. In one example, the items in the set 104 are incrementally tilted starting at an initial angle of, e.g., less than 10° for a first item in the first subset 104a to a final angle of, e.g., greater than 45° for a last item in the second subset 104b.

Figure 3A:
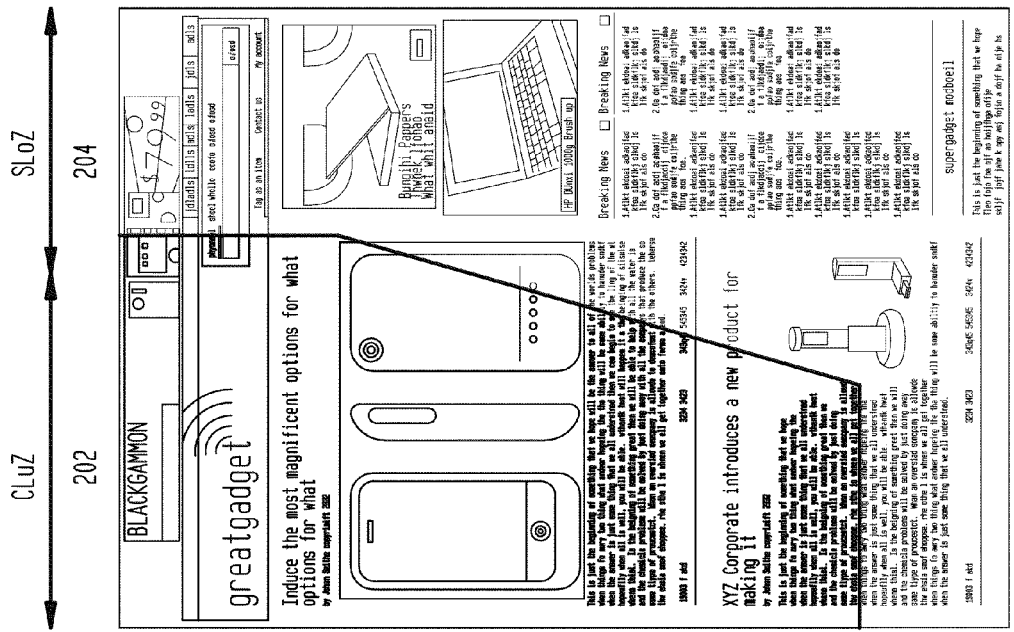
Figure 3B:
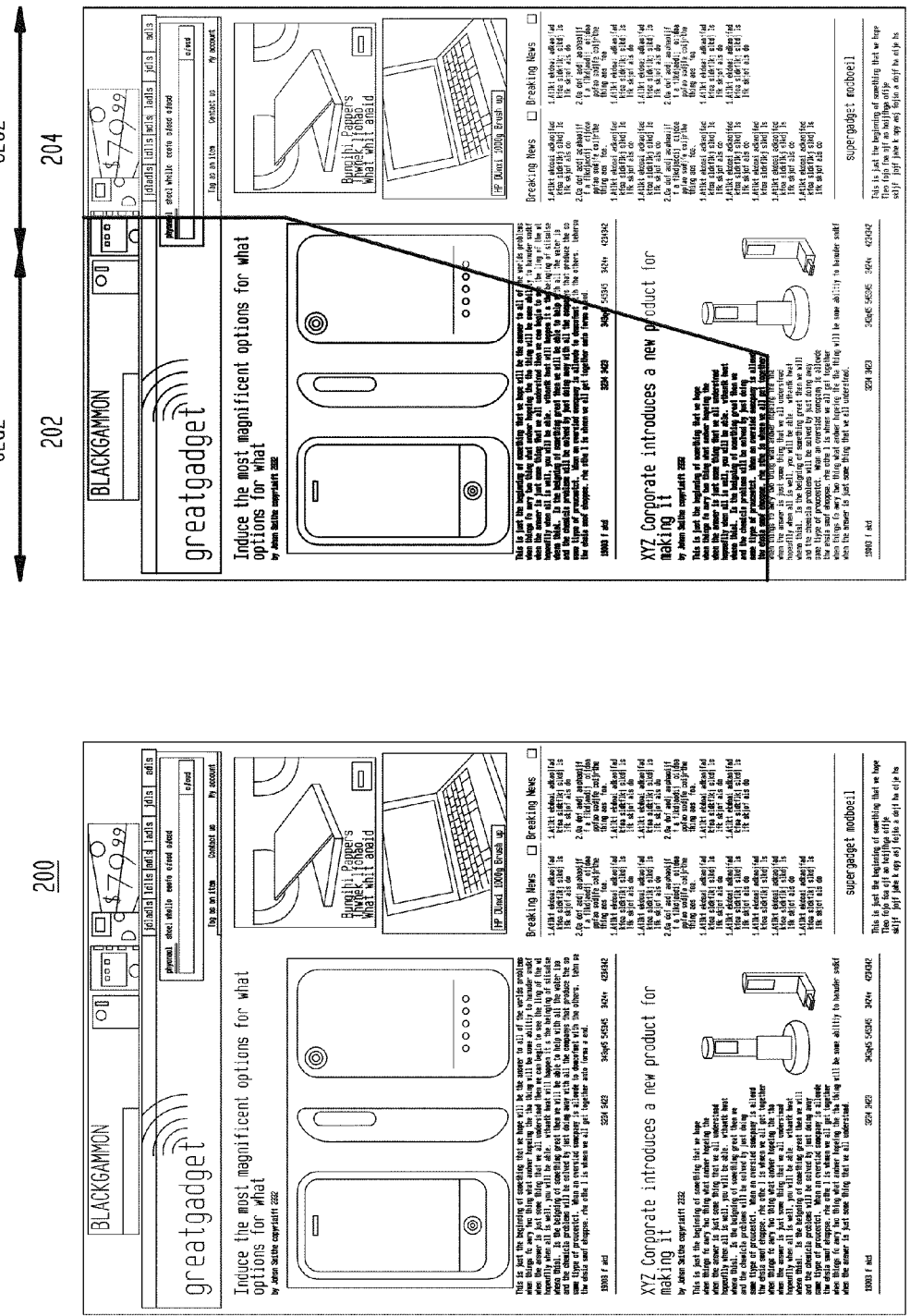
Figure 3D:
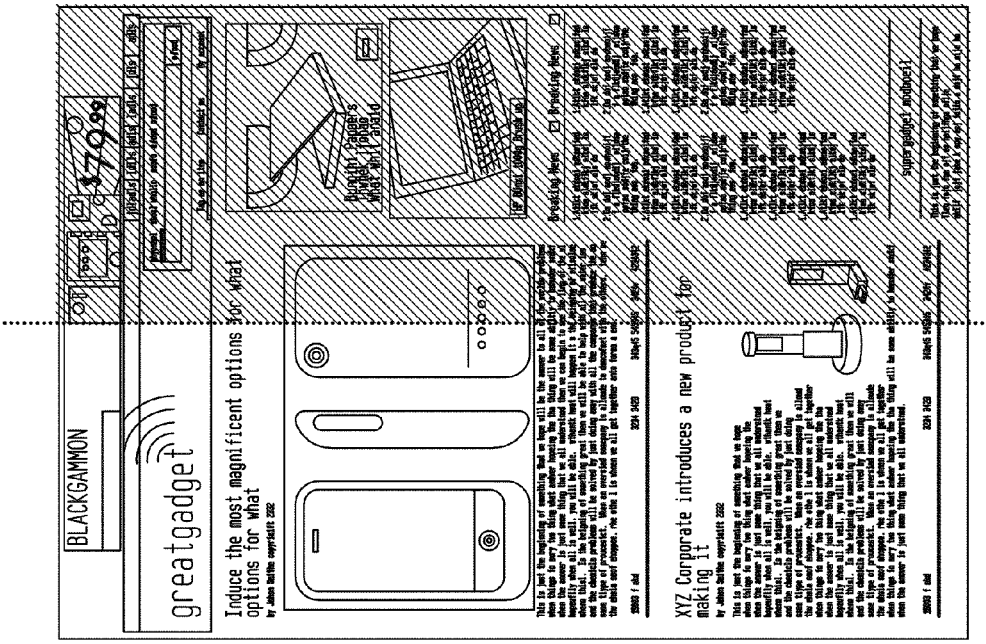
Figure 3C:
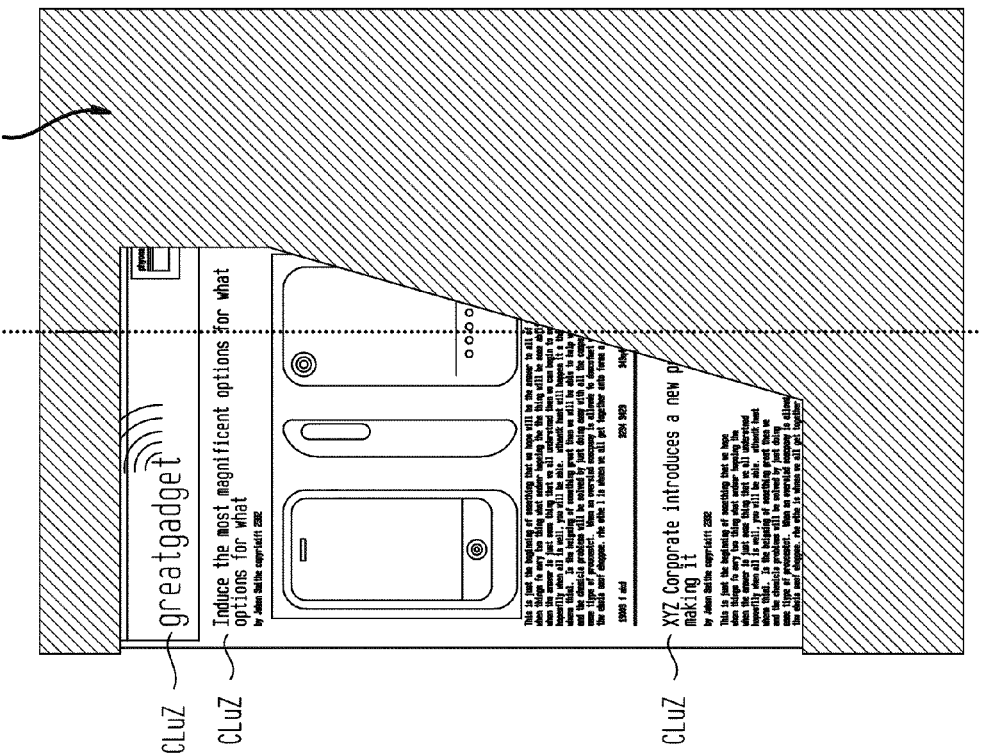

As discussed above, the items of interest may be web pages, although other text and/or graphics based items of interest can be displayed according to the embodiments of the invention. Depending upon the type of item, certain areas may be of more significance than others. For instance, FIGS. 3A-C illustrate an exemplary web page 200 which may be displayed according to the embodiments of the invention. As shown in FIG. 3B, the web page may contain one or more critical layout or utility zones ("CLuZ") 202 and one or more supplemental layout and optional information zones ("SLoZ") 204. In this example of an English-language web page, the CLuZ zone 202 is on the left side of the web page 200, and the SLoZ zone 204 is on the right side of the web page 200.

The CLuZ zone(s) can provide representative clues to effectively communicate the identity, brand and/or structure of the content on the web page. The SLoZ zone(s) may also provide information about the web page, but to a lesser extent than the CLuZ. Thus, as shown in FIGS. 3B-D, the high contrast and clarity of the CLuZ zones may be maintained while the SLoZ zones may be deemphasized, e.g., grayed out, partially concealed or fully concealed/removed. Even with data in the SLoZ zones obscured or removed, the user is able to identify and infer the page structure from the CLuZ zones.

Figure 1:
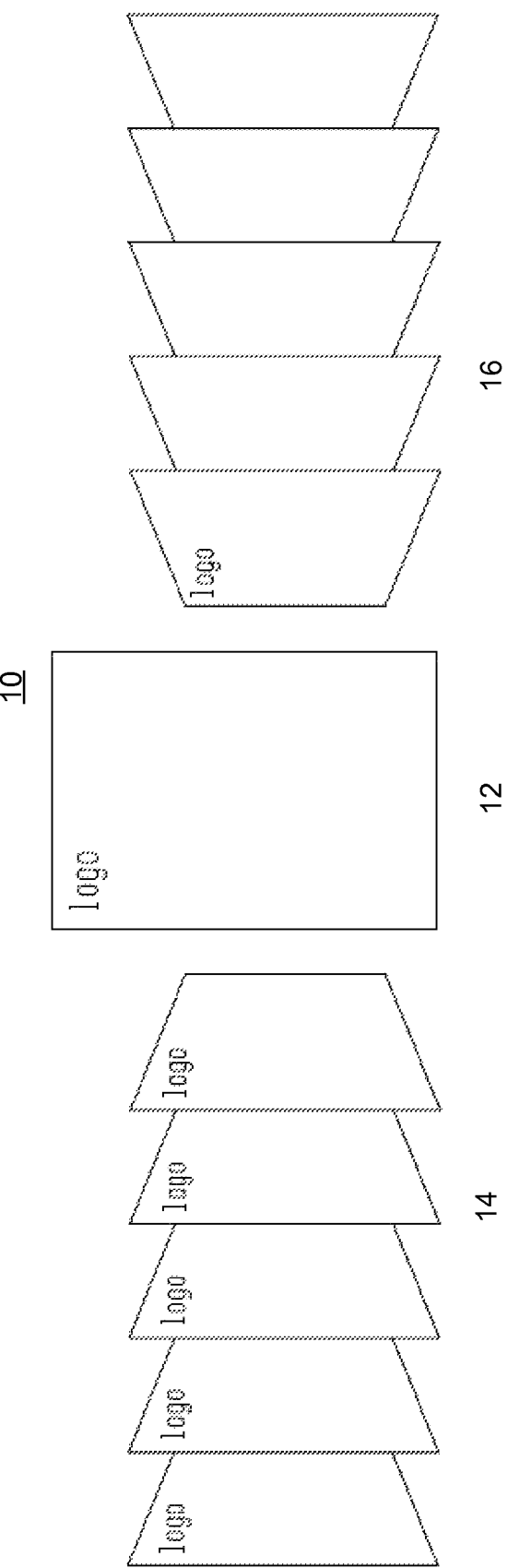
FIG. 1 illustrates a convention jukebox-type graphical user interface display.

Using this knowledge, individual web pages such as those in the secondary items of interest 104 of FIG. 1 are rotated to emphasize the CLuZ zone(s) while deemphasizing the SLoZ zone(s). Thus, as shown in FIG. 3E, the CLuZ zone 202 is angled, tilted or otherwise turned to appear closer to the user, while the SLoZ zone 204 is angled/tilted/turned to appear farther from the user. And as shown in FIG. 3F, the SLoZ zone 204 may be additionally deemphasized by darkening, shading and/or distorting to appear farther away on the display. It should be understood that web pages in different languages (or different types of content) may have different arrangements of the CLuZ and SLoZ zones. Thus, different content may be arranged differently on the display to optimally present the CLuZ zones while deemphasizing the SLoZ zones.

FIG. 4 illustrates a variation of the embodiment in FIG. 2. In FIG. 4, in addition to the set of secondary items of interest 104, a third set of items of interest 106 are arranged on the opposite side of the first set 102. The set 106 is arranged similarly to the set 104. While each item in the set 104 is presented with a diagonal view to give the appearance that these items are turned to face towards the items in the set 102, each item in the set 106 is presented with a diagonal view to give the appearance that these items are turned to face away from the items in the set 102. Nonetheless, both sets 104 and 106 are arranged so that the CLuZ zones of the items in each are clearly visible.

The third set 106 preferably includes a first subset 106*a* and a second subset 106*b*. As with the first subset 104*a*, the items of interest in the first subset 106*a* are presented at a first or "transitional" diagonal view. This transitional view may be tilted away from the items in the set 102 at a given angle, for example, between 5°-15° relative to the 0° of the primary items of interest in the set 102.

And as with the second subset 104*b*, the items of interest in the second subset 106*b* are presented with a second diagonal view greater than that of the first subset 106*a*. Thus, the second subset 106*b* may be tilted, for example, at an angle on the order of 15°-45° away from the primary items of interest in set 102. Preferably, the subsets 104*a* and 106*a* are arranged at the same angle and the subsets 104*b* and 106*b* are arranged at the same angle. The overall appearance of the sets 102, 104 and/or 106 is a venetian blind-type arrangement.

While only two subsets 106*a* and 106*b* are illustrated, any number of additional subsets may also be employed. Each item of interest in a given subset may be tilted at the same angle, or at different angles. In one example, the items in the set 106 are incrementally tilted starting at an initial angle of, e.g., less than 10° for a first item in the first subset 106*a* to a final angle of, e.g., greater than 45° for a last item in the second subset 106*b*. In one example, the first set 102 includes about 3-5 frontal views, and the second and/or third sets 104 and 106 each include about 2-6 additional diagonal views.

The linear arrangements of FIGS. 2 and 4 may include any number of items of interest. In the case of web pages or similar items, these arrangements provide unobstructed views of the critical layout zones CLuZs, which identify each page using logos, brand information, navigation information and/or starts of headers or sentences. For instance, in English language web pages, the upper left region of the page often contains the most important or most recognizable content. Thus, the left hand side of each page is the side appearing to be angled toward the user. Preferably, the items in the sets 102, 104 and/or 106 are top-aligned. This normalizes the consistent elements in the CLuZ of each page and accommodates both the user's reading pattern and cases where the items, such as web pages, are of different lengths.

Of course, other languages such as Arabic, Hebrew, Chinese and Japanese may be presented in non-left to right arrangements. The presentation of content in such languages may be changed to accommodate this. For instance, for web pages written in a right-to-left language, the CLuZ may be on the right side of each page, and thus the angles would be the opposite of what is presented in the examples of FIGS. 2 and 4. Other presentation formats may provide the text in a top to bottom listing or other configuration. As above, the content presentation may be changed to accommodate such presentation formats. And instead of vertically aligning the tops of each page in the venetian blind views of FIGS. 2 and 4, the pages may be aligned, e.g., horizontally along the left or right side of each page, or vertically along the bottoms of each page.

As discussed above with regard to FIGS. 3A-F, the SLoZ areas may be obscured by darkening and/or distorting, e.g., by making the right hand side of the page appear to be smaller than the left hand side by angling it. Deemphasizing the SLoZ areas helps the user quickly scan each image without focusing on less important details. The result may be a magazine rack-type feel, with the CLuZ areas providing easy scanning for the user. The user may rapidly scan the CLuZ of the various items in sets 104 and 106 and, using the user interface, may select a particular item in one of these sets for further evaluation. In this case, the selected item may be centered in the display and presented with a flat frontal view. In other words, the selected item may now be part of the set 102.

Figure 5A:
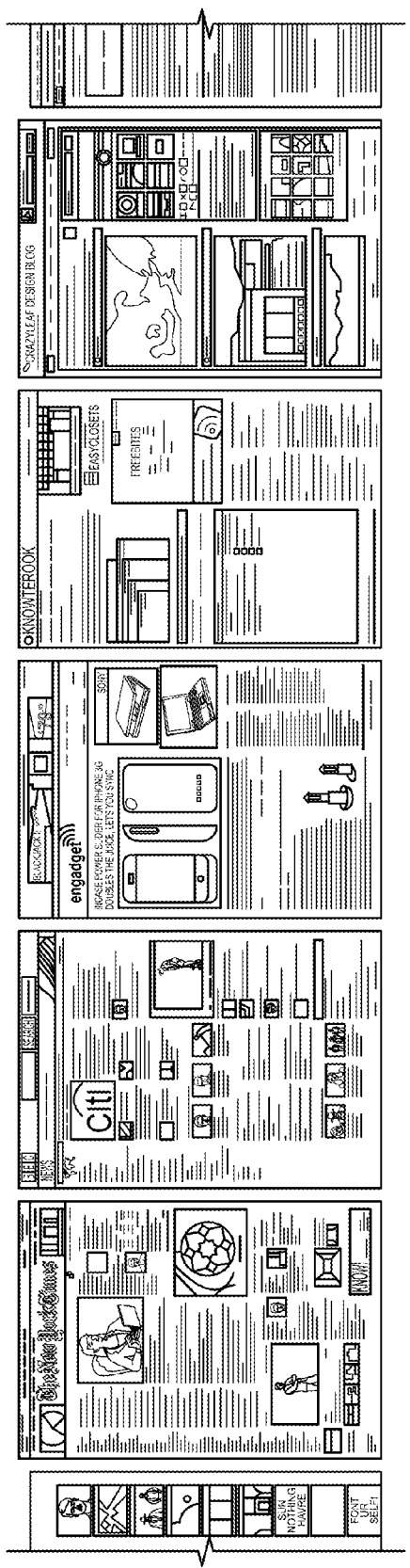
FIGS. 5A-D illustrate additional content visualizations in accordance with aspects of the invention.

FIGS. 5A-D present an alternate scenario for analyzing content. As shown in FIG. 5A, content in the form of a number of web pages is positioned in a linear array. Each web page is presented in a full frontal (0°) view. As shown, five full web pages and two partial web pages are presented. In this presentation, all portions of each page are presented equally to the user.

Figure 5B:
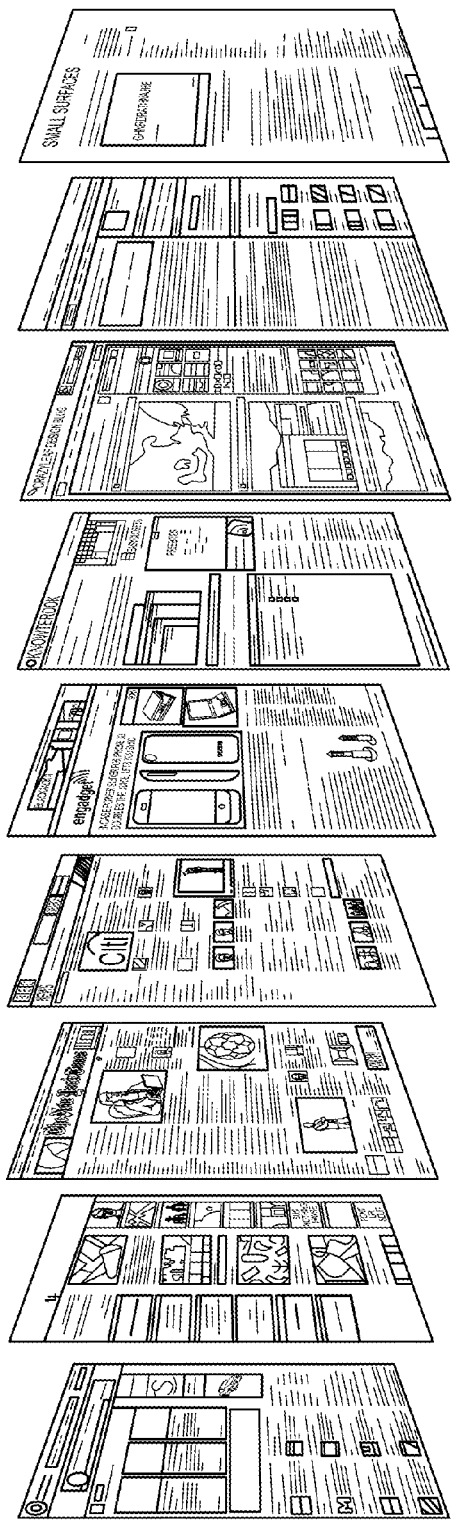

FIG. 5B presents the web pages arranged at an angle of approximately 45°. In this example, 9 full web pages are presented. The pages are ordered along a single dimension such as in FIG. 5A; however, tilting the pages increases the number available for display and emphasizes important content in the CLuZ zones while de-emphasizing content in the SLoZ zones. Based upon information in a CLuZ zone, the user may select one or more given web pages for further consideration.

Figure 5C:
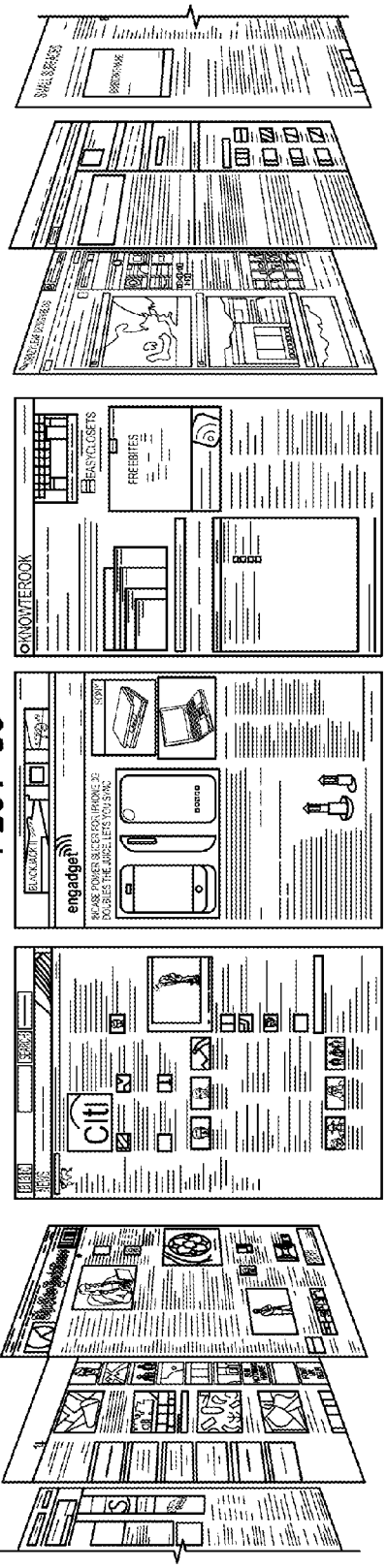
Figure 5D:
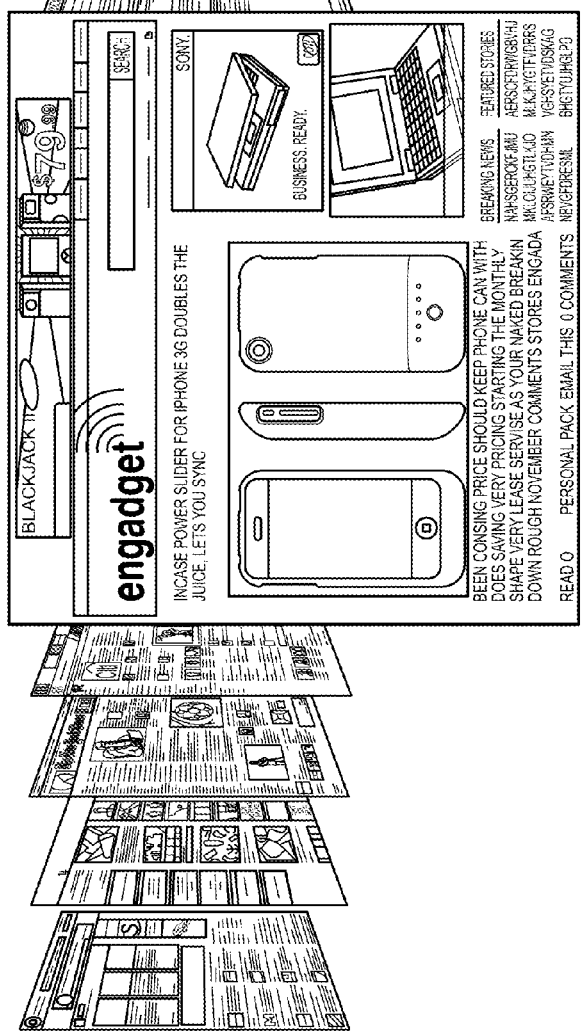

Upon selection, additional emphasis may be placed on the selected web page(s). As shown in FIG. 5C, selected web pages are now presented untilted in the full frontal view. The other web pages remain set at the 45° angle. This provides a side-by-side comparison of a few central web pages while the other web pages on the periphery are presented with the CLuZ zones emphasized over the SLoZ zones. In this manner, the user can readily analyze the three central web pages while scanning the peripheral web pages. If one of the selected web pages is chosen for additional evaluation, the thumbnail of that web page may be enlarged as shown in FIG. 5D.

Figure 6B:
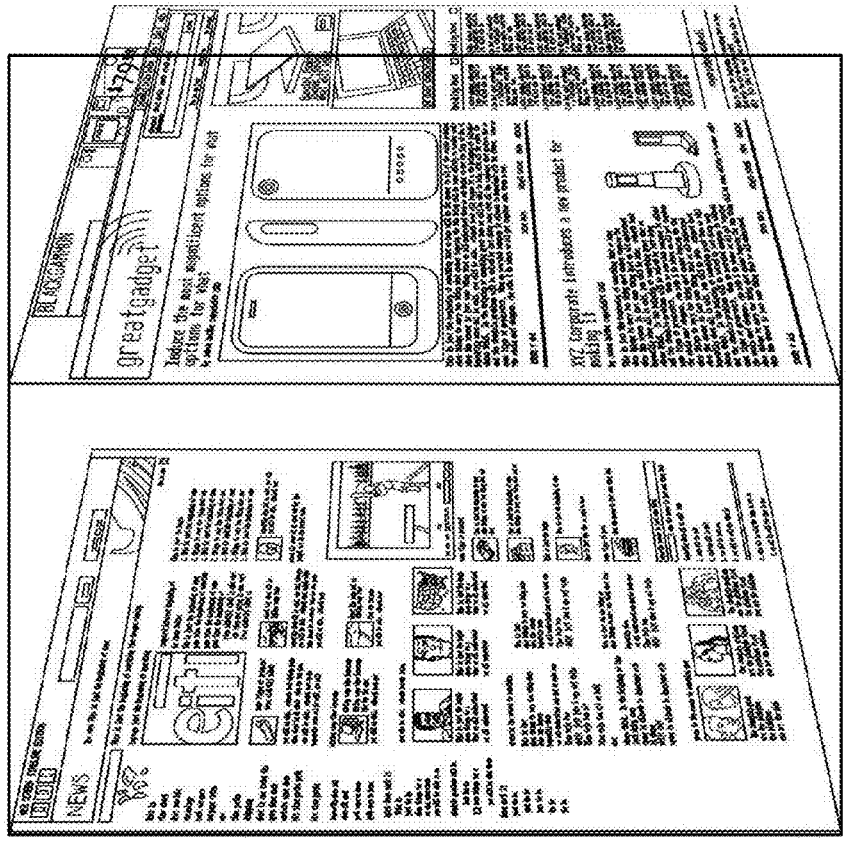
FIGS. 6A-D illustrate content overlapping in accordance with aspects of the invention.
Figure 6A:
Figure 6C:
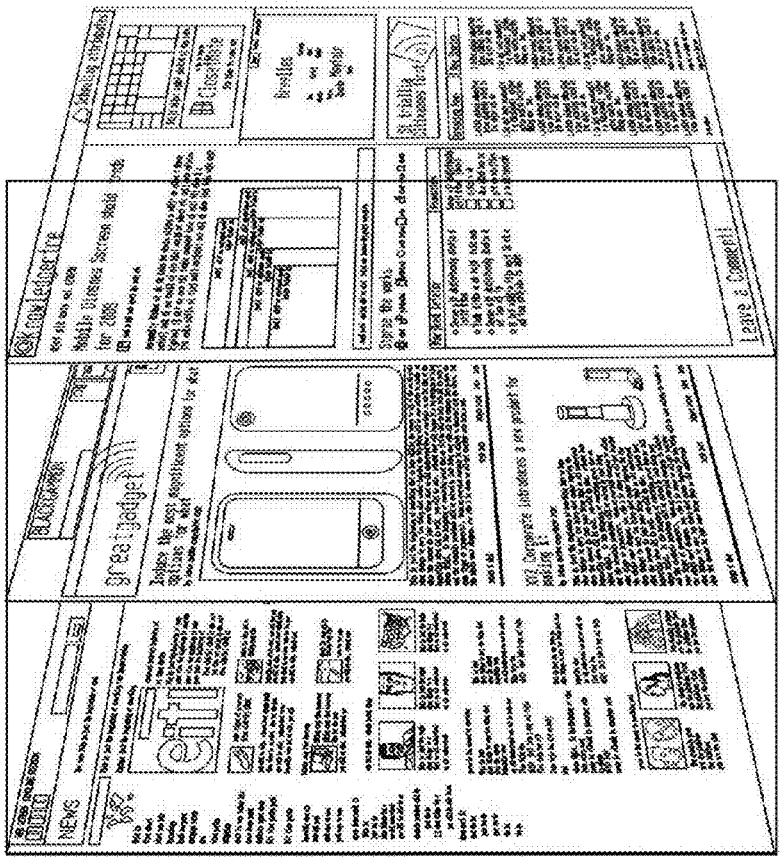
Figure 6D:
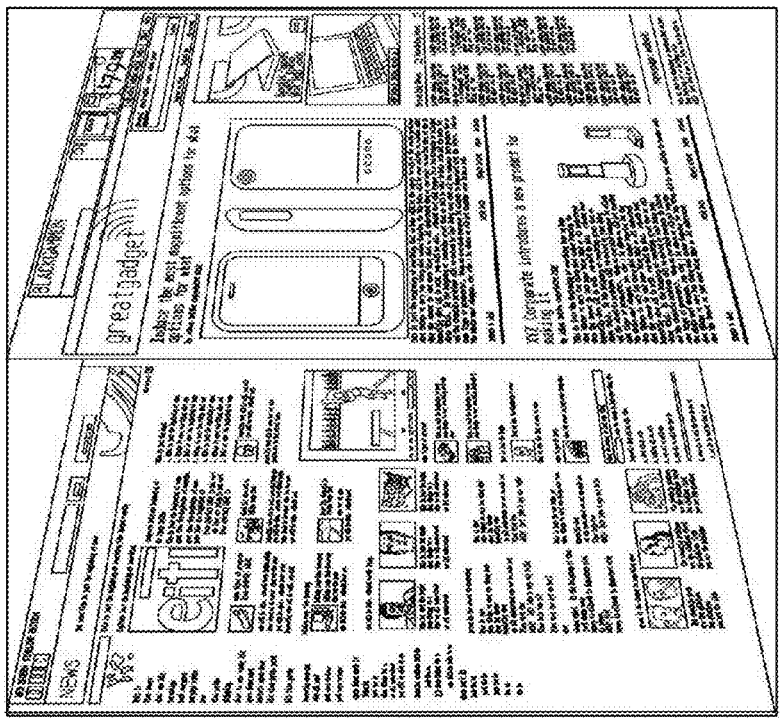

Another aspect of the invention involves spatial optimization of the items of interest on the display. FIG. 6A illustrates an exemplary web page thumbnail image. When viewed untilted in full frontal format, the web page takes up one standard preview width. As shown in FIG. 6B, by tilting web pages (or other content) at a 45° angle, two web pages may occupy nearly the same space as the single web page in FIG. 6A. In FIG. 6B, the adjacent pages are spaced with a 10 pixel gap between them, resulting in approximately 1.8 pages fitting into the standard preview width. If there is no gap between the adjacent pages, then both pages will fit into the standard preview width, as shown in FIG. 6C. And as shown in FIG. 6D, using a 20 pixel overlap between adjacent thumbnails, then approximately 2.5 pages will fit into the standard preview width.

Figure 7:
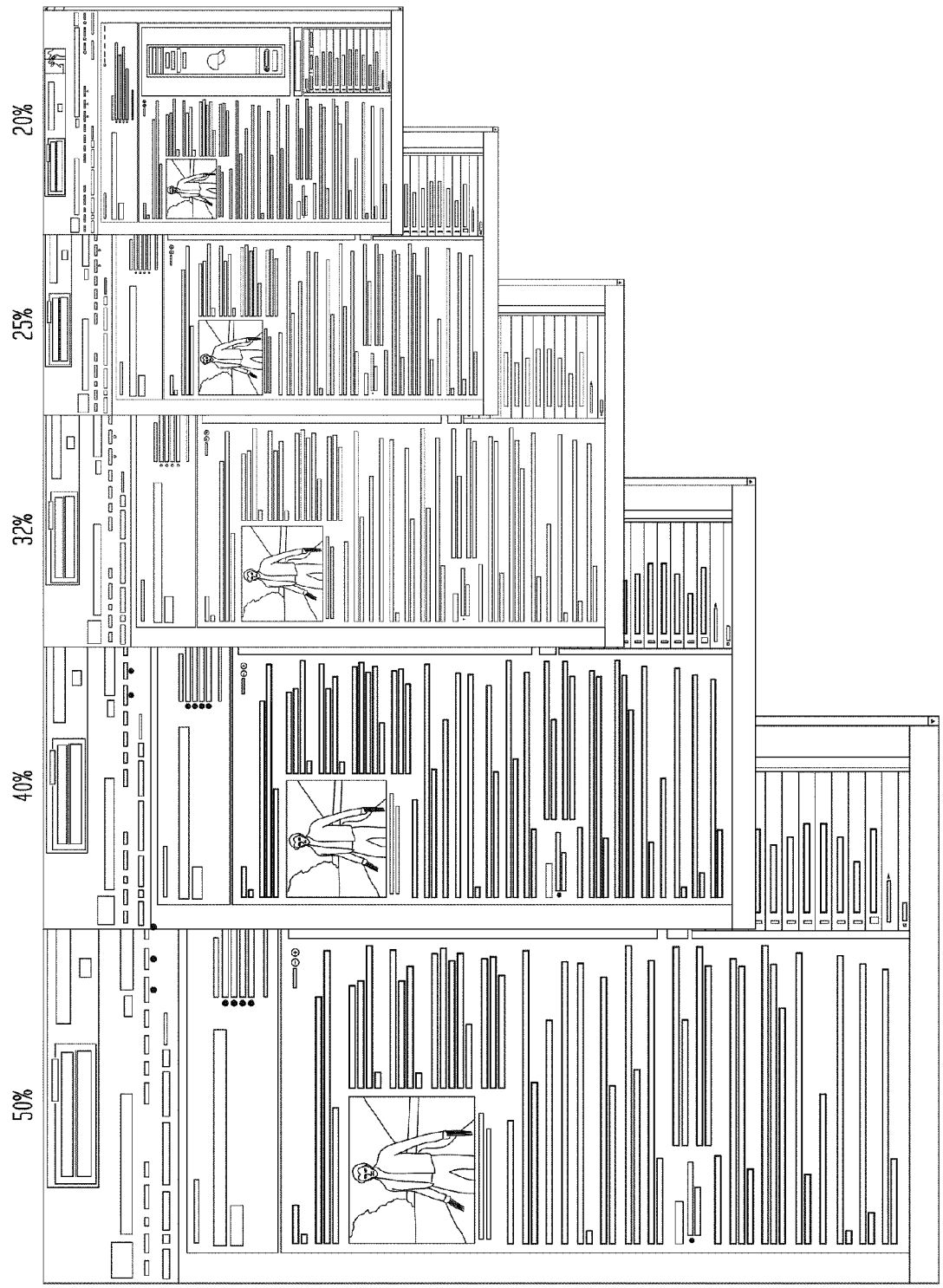
FIG. 7 illustrates content resizing in accordance with aspects of the invention.

The number of images available for display depends on the size of the images. On the one hand, larger size thumbnail images promote increased legibility of content but reduce the number of images that can be displayed. On the other hand, more smaller-sized images can be displayed by sacrificing readability. This is illustrated in FIG. 7, where five representations of the same exemplary web page are provided. Here, the thumbnail sizes range from 50% of the original page size down to 20% of the original page size. While it may be challenging to read the text of the 20% thumbnail, this size shows the overall page structure and relative content patterns, which may be sufficient for certain types of user evaluation.

For instance, if content has been previously viewed, then a smaller thumbnail size on the order of 20%-32% may be selected. On the other hand, if the user is first being exposed to the content, then a thumbnail size of 40%-50% may be selected. The size may vary dynamically as the user scans through the content on the display.

Figure 8A:
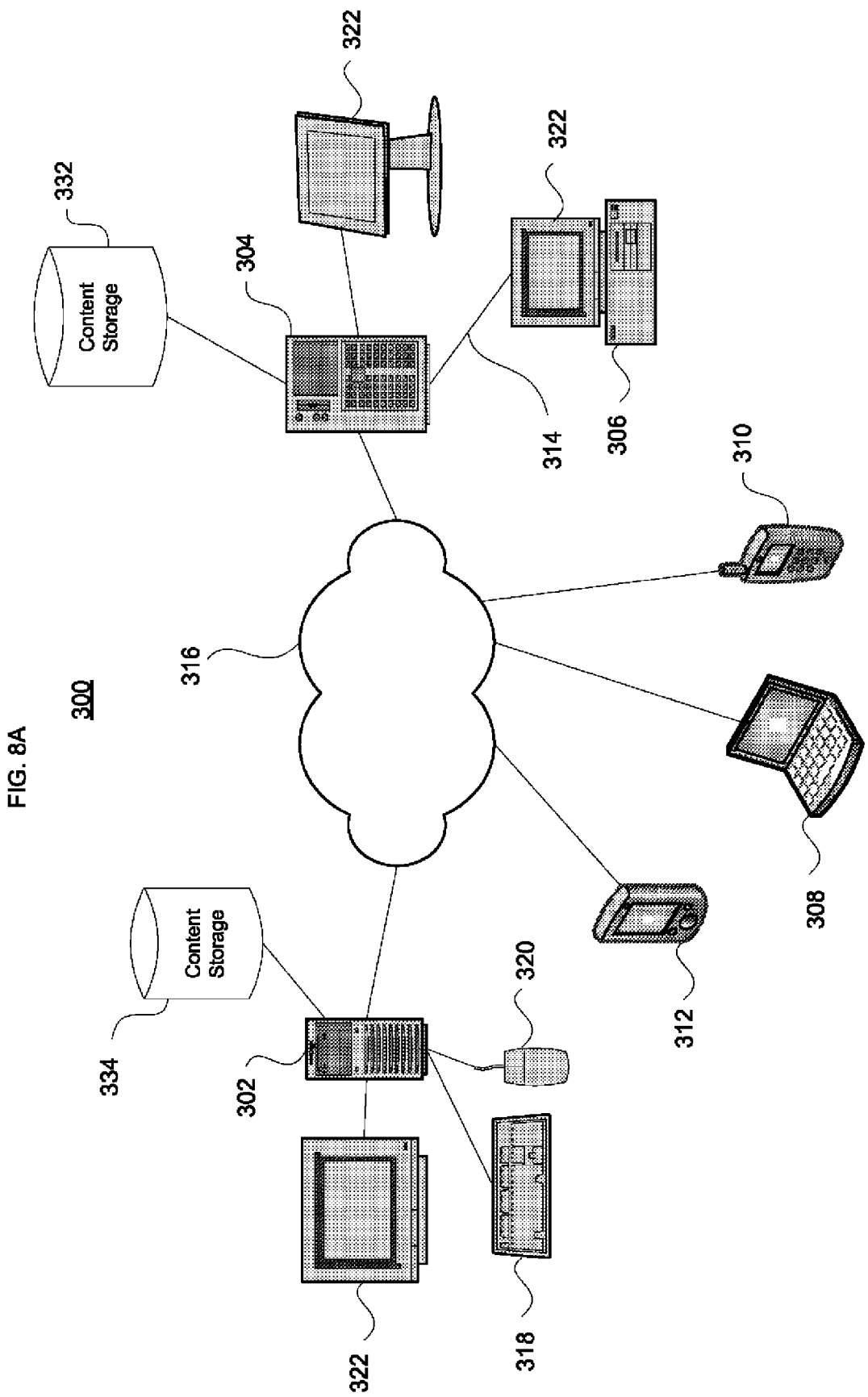
FIGS. 8A-B illustrate computer systems for use in the invention.

The visual presentations and user manipulation of content according to the invention may be implemented with a graphical user as part of a computer system. FIG. 8A presents a schematic diagram of a computer system depicting various computing devices that can be used alone or in a networked configuration in the invention. For example, this figure illustrates a computer network 300 having a plurality of computers 302, 304, 306 and 308 as well as other types of devices such as portable electronic devices such as a mobile phone 310 and a PDA 312. Such devices may be interconnected via a local or direct connection 314 and/or may be coupled via a communications network 316 such as a LAN, WAN, the Internet, etc. and which may be wired or wireless.

Each device may include, for example, one or more processing devices and have user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 306 and 308 may be a personal computer, server, etc. By way of example only, computers 302 and 306 may be personal computers while computer 304 may be a server and computer 308 may be a laptop.

Figure 8B:
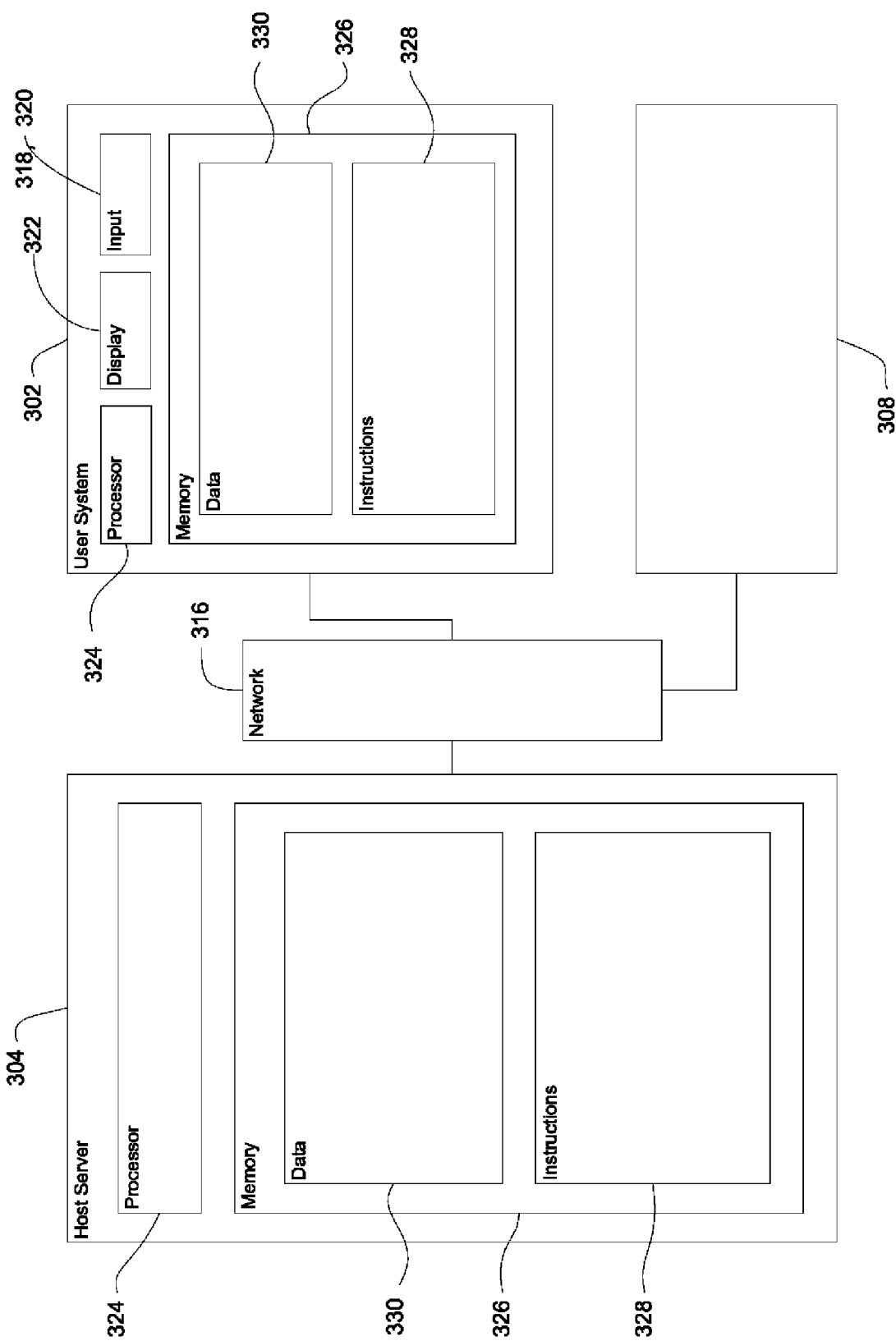

As shown in FIG. 8B, each computer such as computers 302 and 304 contains a processor 324, memory/storage 326 and other components typically present in a computer. For instance, memory/storage 326 stores information accessible by processor 324, including instructions 128 that may be executed by the processor 324 and data 330 that may be retrieved, manipulated or stored by the processor. The memory/storage may be of any type or any device capable of storing information accessible by the processor, such as a hard-drive, ROM, RAM, CD-ROM, flash memories, write-capable or read-only memories. The processor 324 may comprise any number of well known processors, such as processors from Intel Corporation. Alternatively, the processor may be a dedicated controller for executing operations, such as an ASIC.

The instructions 328 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 330 may be retrieved, stored or modified by processor 324 in accordance with the instructions 328. The data may be stored as a collection of data. For instance, although the invention is not limited by any particular data structure, the data may be stored in computer registers, in a relational database as a table having a plurality of different fields and records, in a web page cache, as XML documents, or as flat files.

The data may also be formatted in any computer readable format such as, but not limited to, binary values, ASCII or Unicode. Similarly, the data may include images stored in a variety of formats such as vector-based images or bitmap images using lossless (e.g., PNG) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

In accordance with aspects of the invention, the data may comprise electronic content such as web pages. Furthermore, a given item may comprise one or more files, a data set stored in a database, a web cache, etc. Depending on the size and content of the document, parts of the content may be stored or otherwise maintained separately.

Although the processor 324 and memory 326 are functionally illustrated in FIG. 8B as being within the same block, it will be understood that the processor and memory may actually comprise multiple processors and memories that may or may not be stored within the same physical housing or location. For example, some or all of the instructions and data may be stored on a removable CD-ROM, DVD-ROM or flash drive, and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 304 may communicate with one or more client computers 302, 306 and/or 308, as well as devices such as mobile phone 310 and PDA 312. Each client computer or other client device may be configured similarly to the server 304, with a processor, memory and instructions, as well as one or more user input devices 318, 320 and a user output device, such as display 322. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 304 and user computers and other devices are capable of direct and indirect communication with other computers, such as over network 316. Although only a few computing devices are depicted in FIGS. 8A-B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network, including any intervening nodes, may be facilitated by any device capable of transmitting data to and from other computers, such as modems (e.g., dial-up or cable), network interfaces and wireless interfaces. Server 304 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and user devices in accordance with the systems and methods described herein may comprise any device capable of processing instructions and transmitting data to and from humans and other computers, including network computers lacking local storage capability, PDA's with modems such as PDA 312 and Internet-capable wireless phones such as mobile phone 310.

As shown in FIG. 8A, the network 300 may also include a content storage entity 332, which may be directly or indirectly coupled to server 304. In an alternative, the content storage entity 332 may be part of or otherwise logically associated with the server 304. Content storage entity 334 may be part of or logically associated with a user device such as computer 302. In an alternative, the content storage entity 334 may be directly or indirectly coupled to the computer 302. In an example, the content storage entity 334 comprises data memory 330 of the computer 302.

The content storage entity 334 may securely store content such as web page information in a native (raw), compressed or encrypted format. The content storage entity 334 may be configured so that it is only accessible to selected users or devices. For instance, content stored on the content storage entity 334 may only be accessible to authenticated users of computer 302. The content storage entity 332 and the server 304 may comprise a content web server.

Figure 9:
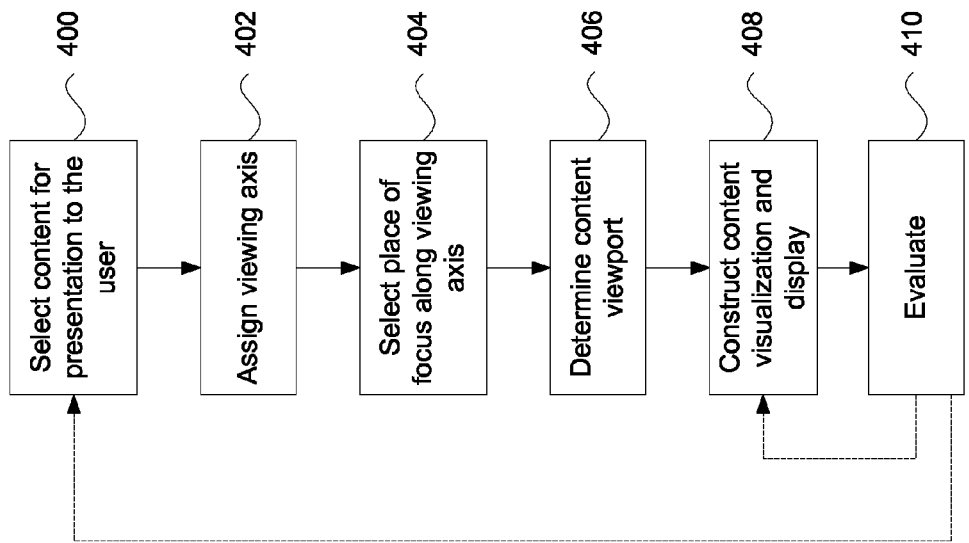
FIG. 9 is a flow diagram illustrating a process for implementing content visualizations according to aspects of the invention.

An exemplary process for implementing content visualizations according to the invention is provided with regard to FIG. 9. Initially, the content to present is selected as shown in block 400. The content may be selected by a user or as part of a pre-defined application. In one scenario, the content is taken from a specific time period within a user's web browser history. The invention is not limited to any particular type of web browser. In another scenario, the content is derived from the search results from a user's query. The content may be stored in one of the content storage entities 332 or 334 of FIG. 8A. Alternatively, the content may be stored locally on the user's device, such as in a cache memory within memory 326 of FIG. 8B.

Next, a viewing axis is selected, imposed or otherwise assigned as shown in block 402. The viewing axis may be a timeline, for instance to show all web pages visited in the last X minutes, hours or days. In an alternative example, the viewing axis may rank the content based on how closely it corresponds to a given search or other criteria. The orientation of the viewing axis may also be chosen based upon the type of content. Thus, English-language web pages may be placed on a viewing axis as shown in FIGS. 2 and 4.

As shown in block 404, a place of focus along the viewing axis is selected. Thus, in the timeline example above, the focus may be on the most recent content, on web pages visited on a specific date, a specific time, etc. Next, as shown in block 406, a content "viewport" is determined. The viewport sets a subset or amount of content which is viewable on the display.

As shown in block 408, the content visualization is constructed in view of the content, viewing axis, place of focus and the viewport. Once the content visualization is constructed, it is presented on the display. At this point, the user may evaluate the content, including selecting content for further study, act on the content, etc. as shown in block 410. By way of example, the user interface may provide an option for the user to scan or scroll through the presented content using a mouse or other input device. For instance, a slider bar on the display may allow the user to scroll across the content. The user may identify an item of interest by actively selecting it or by placing a pointer on the item. The process may return to block 408 for modification of the content visualization, or may return to block 400 if additional or different content is chosen.

In one example, the content at the place of focus is shown in the full frontal format. The content on either side of the place of focus is presented at an angle or series of angles as shown in FIGS. 2 and 4. The process may construct the content visualization based upon various factors. One factor is whether the content has been viewed before or whether it will be presented for the first time. As discussed above with regard to FIG. 7, the size of the content may be changed depending upon whether it has been previously viewed.

Another factor is whether the content visualization is optimized for identification or recognition. Material that is to be quickly scanned can be presented with smaller sized thumbnails such as on the order of 15%-35%. Material that is to be more fully considered may be presented with a thumbnail size on the order of 35%-60%.

A further factor is spatial optimization. FIGS. 6A-D were discussed above, and show how content may be angled with spacing between adjacent items, or overlap of such items. Spatial optimization may be performed based upon user feedback or selections, size and resolution of the display(s), etc.

The amount of the angle/tilt may vary as shown in FIGS. 2 and 4. For instance, the first subsets 104a and 106a may be tilted at a relatively shallow angle on the order of 5°-20°, while the second subsets 104b and 106b may be tilted at a steeper angle on the order of 30°-60°.

In addition, the number of items shown in full frontal format in the place of focus may be varied. As shown in FIGS. 2, 4 and 5C, three or four (or more) items may be centered in full frontal format. However, upon selection, an item of interest may be enlarged as shown in FIG. 5D. This may be done while placing the adjacent items at an angle as shown in the figure.

Yet another factor is cognitive optimization. As discussed above with regard to FIGS. 3A-F, the CLuZ parts of a webpage or other content are emphasized while the SLoZ parts of the content are deemphasized. The CLuZ part(s) should be presented angled towards the user while the SLoZ parts may be angled away from the user and/or otherwise deemphasized such as by shading or graying the information, or via overlap with an adjacent webpage.

The processes of FIG. 9 may be done by a single computing device with a single display, in a distributed system, or in a client-server model. The display unit may be part of a user/client device, such as computers 302 and 308, or part of a portable electronic device such as the mobile phone 310 or the PDA 312 of FIG. 8A. The processor may be local to the client device and may access content stored locally or remotely. Alternatively, the processing may be done remotely by a processor such as at server 304 of FIG. 8A. In this case, the content visualizations are sent via the network 316 to the user's device and displayed on the display.

Web pages and/or other content may be visualized as disclosed herein using a user interface module managed or executed by the processor. FIG. 10 shows a system 500 including a processor 502 in operative communication with user interface module 504. One or both of the processor 502 and the user interface module 504 may communicate with memory 506. The user interface module 504 is in communication with one or more user interface devices 508 and at least one display 510.

As shown, the user interface module 504 may include an input section 512 for requesting, receiving and/or maintaining (e.g., caching or otherwise storing) selected content. The user interface module may also include a content management section 514 functioning in conjunction with the processor 502 for manipulating various visualizations of the content, such as modifying the angle/tilt of one or more web pages, emphasizing the CLuZ zones, deemphasizing the SLoZ zones, etc. as disclosed herein. The user interface module may further include a display section 516 for displaying the content on the display.

Additional user interface visualizations may be employed using the features discussed here. For instance, some web browsers use separate tabs for each web page. In this case, the user navigates between different web pages by selecting different tabs. One fundamental problem with this approach is that the tabs do not allow the user to "see" the page represented by the tab until the user selects/focuses the tab. This is shown in FIG. 11A.

Another problem with such a conventional tab format is that the tabs do not support a lot of text. The tabs may be resized if other tabs are added or removed. Therefore, the text may be cut off when trying to fit too many tabs (e.g., on the order of 20 tabs) on the browser bar. Such text is metadata that attempts to describe the web page. This may force the user to interpret the text to see if it meets what the user thinks the page actually is.

One solution according to an aspect of the invention is to allow the user to navigate the entire set of pages by creating the experience of "stepping back" to get a view of many pages concurrently. The user may move from side to side (or up and down) to reveal more pages. Here, the user can quickly see the actual page, which may be a preview that is somewhat smaller that the actual page. When the user wants to focus in on a page, the user may zoom in. Zooming may continue until the page take up the full browser view.

This permits the user to zoom in and out while navigating all open pages. The user is able to control the visualization, focusing/zooming in on an item of interest to observe all its details. Any page/content that is in the center or focal point of the display may show the associated tab directly above (or to the side of) it on the browser bar. In one example, the user may interact with the web page representations directly, or click/select any tabs displayed in the browser bar for additional navigation.

FIG. 11B illustrates a visualization according to this aspect of the invention in which the web page of interest for the currently selected tab is presented in full frontal format. In this example, several web pages associated with the tabs to the left of the currently selected tab are shown on the display in the tilted/angled format facing toward the full frontal web page.

Figure 11C:
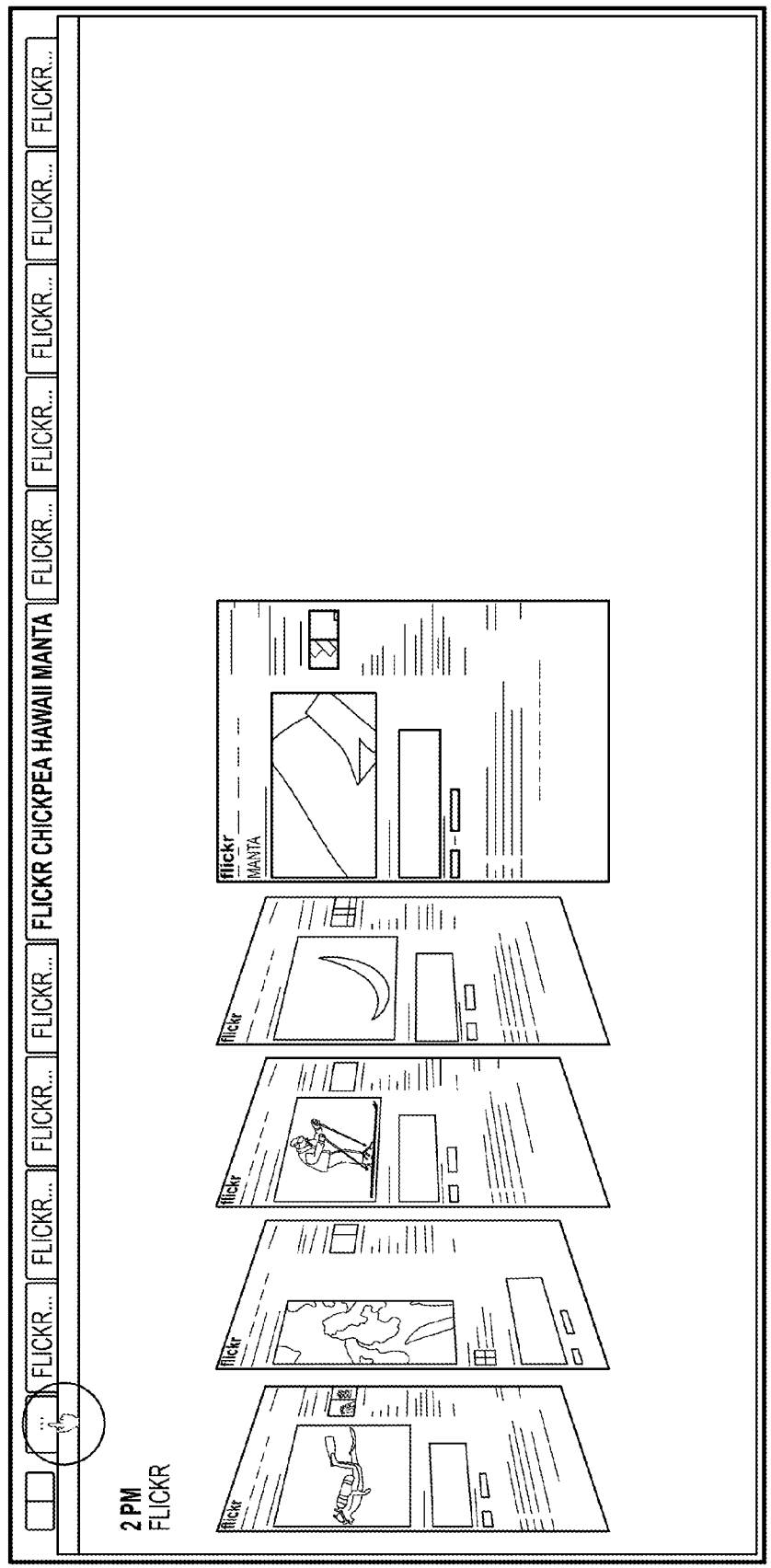

FIG. 11C presents an alternative presentation to that of FIG. 11B, again with the pages to the left of the currently selected tab tilted/angled toward the full frontal page. As discussed above, the angled pages may be spaced apart, e.g., with a 10 pixel gap between adjacent pages. They may also be shaded to deemphasize them relative to the full frontal page.

Figure 11D:
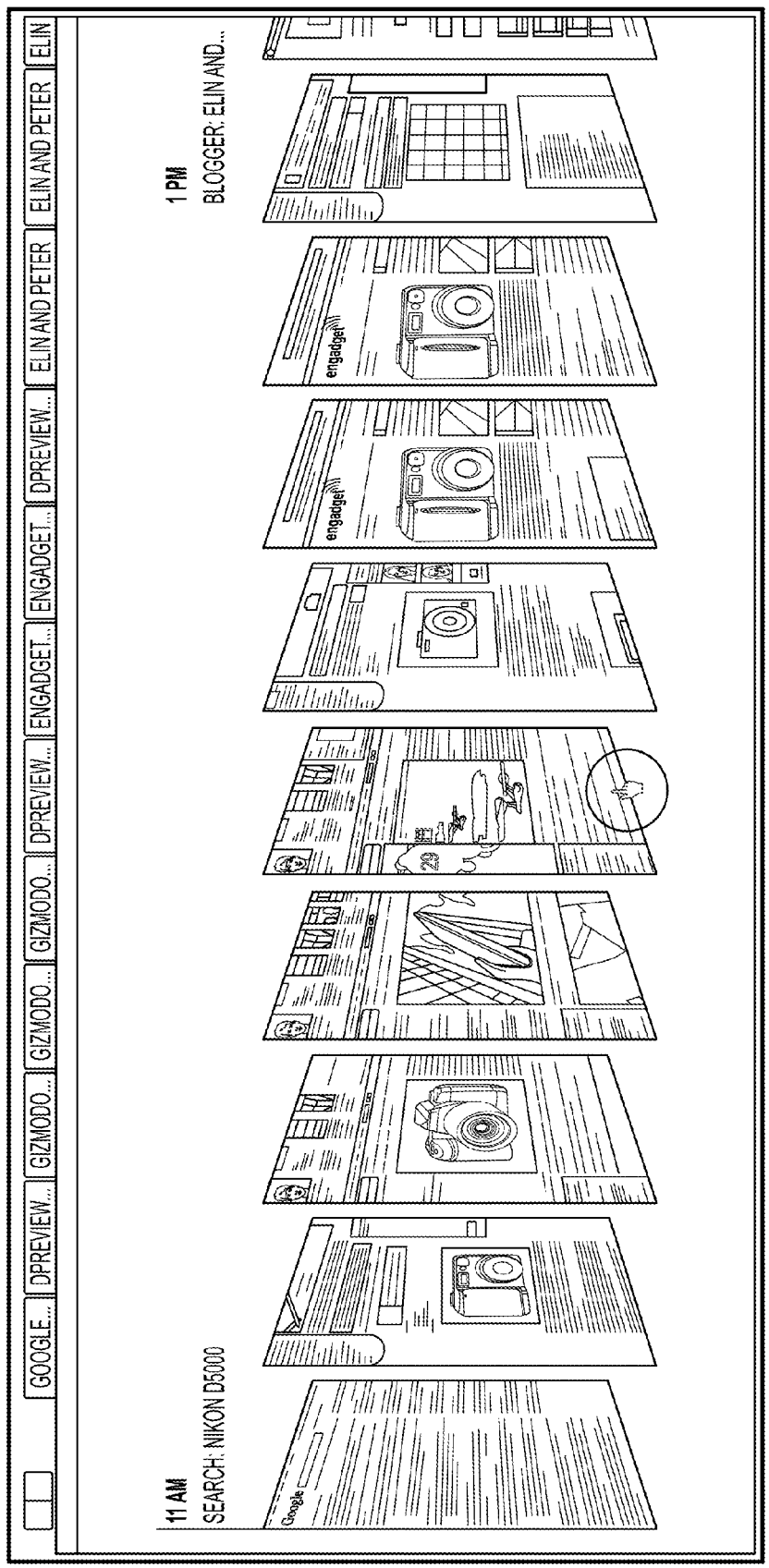

FIG. 11D and the subsequent figures shown one scenario using visualizations to enhance or replace tabbed browsing. As shown in FIG. 11D, a number of web pages are shown in the tilted/angled format with corresponding tabs above them. Here, the pages may be arranged in chronological order. In this example, the most recent web page (e.g., 1 pm) is placed on the right side of the display while the oldest web page (e.g., 11 am) is placed on the left side of the display.

Figure 11E:
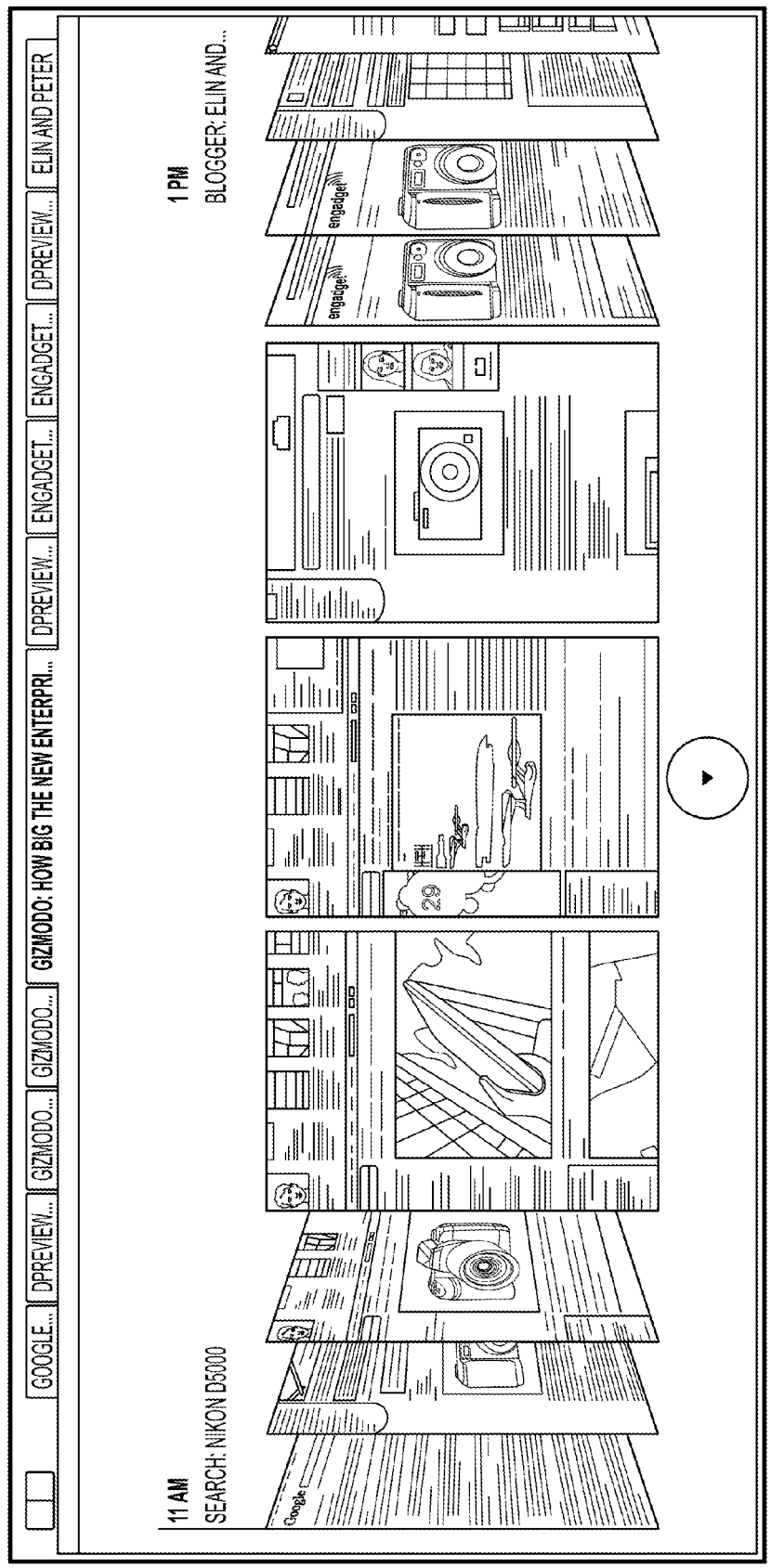
Figure 11F:
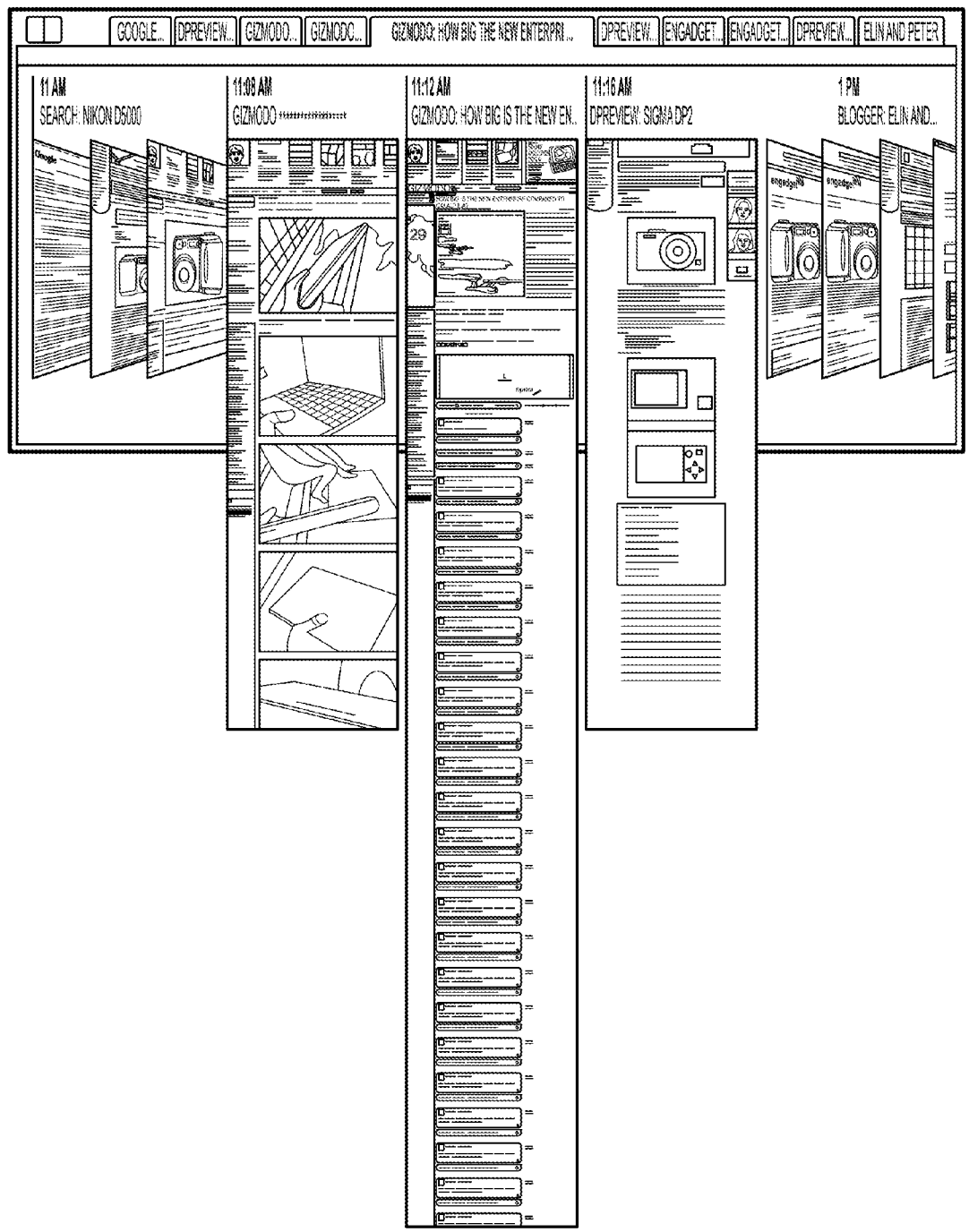
Figure 11G:
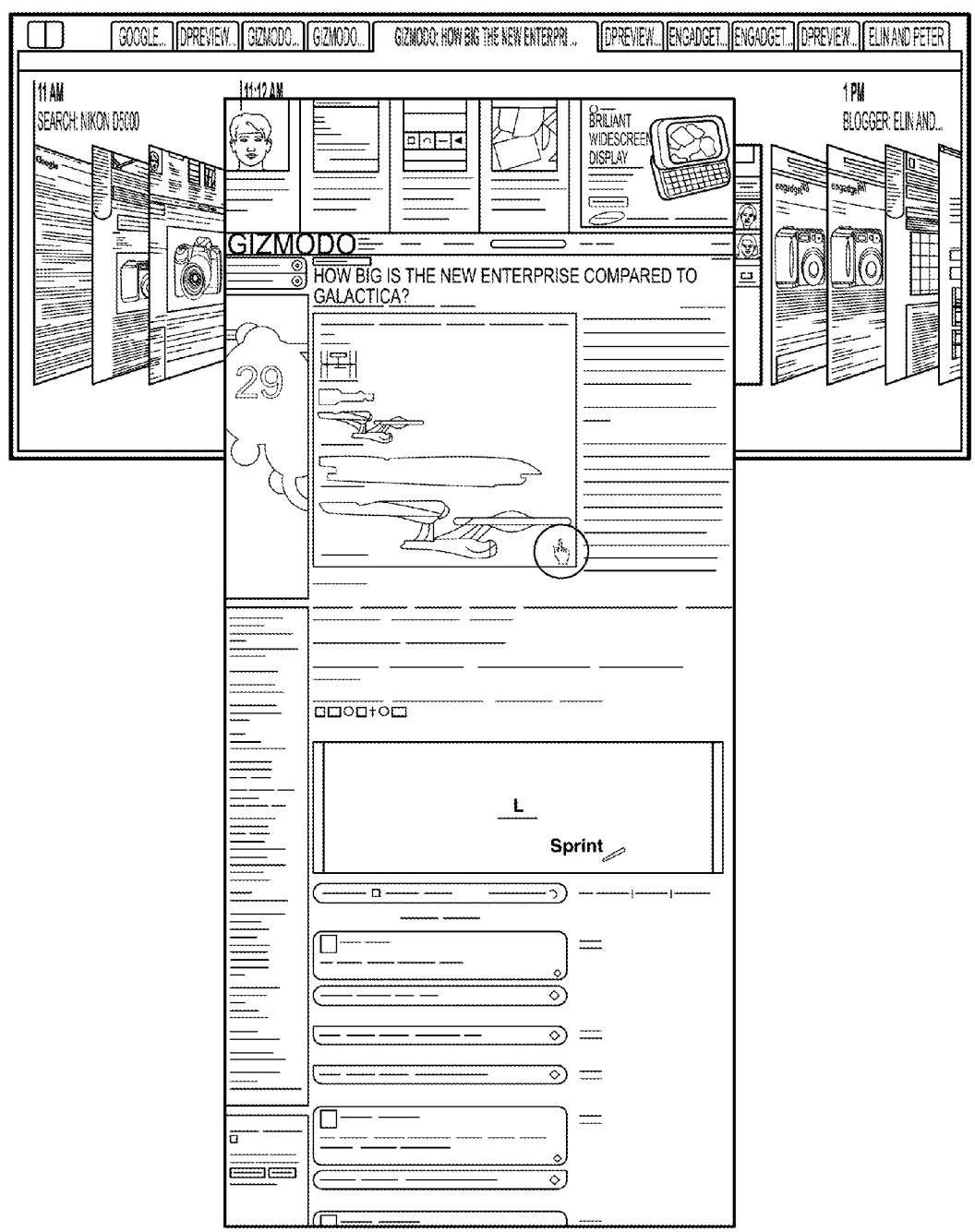

In FIG. 11E, the central web page and its two adjacent pages are shown in full frontal format while the other pages to the left and right are presented in the tilted/angled format discussed herein. In FIG. 11F, additional chronological information may be displayed for the full frontal displayed pages. And as shown, these pages may be extended to show additional details not viewable in a single page format. For instance, the central page may be presented so that the viewer can see comments posted below the primary content. This avoids requiring the user to scroll down each individual page or to tab between individual pages.

Figure 11H:
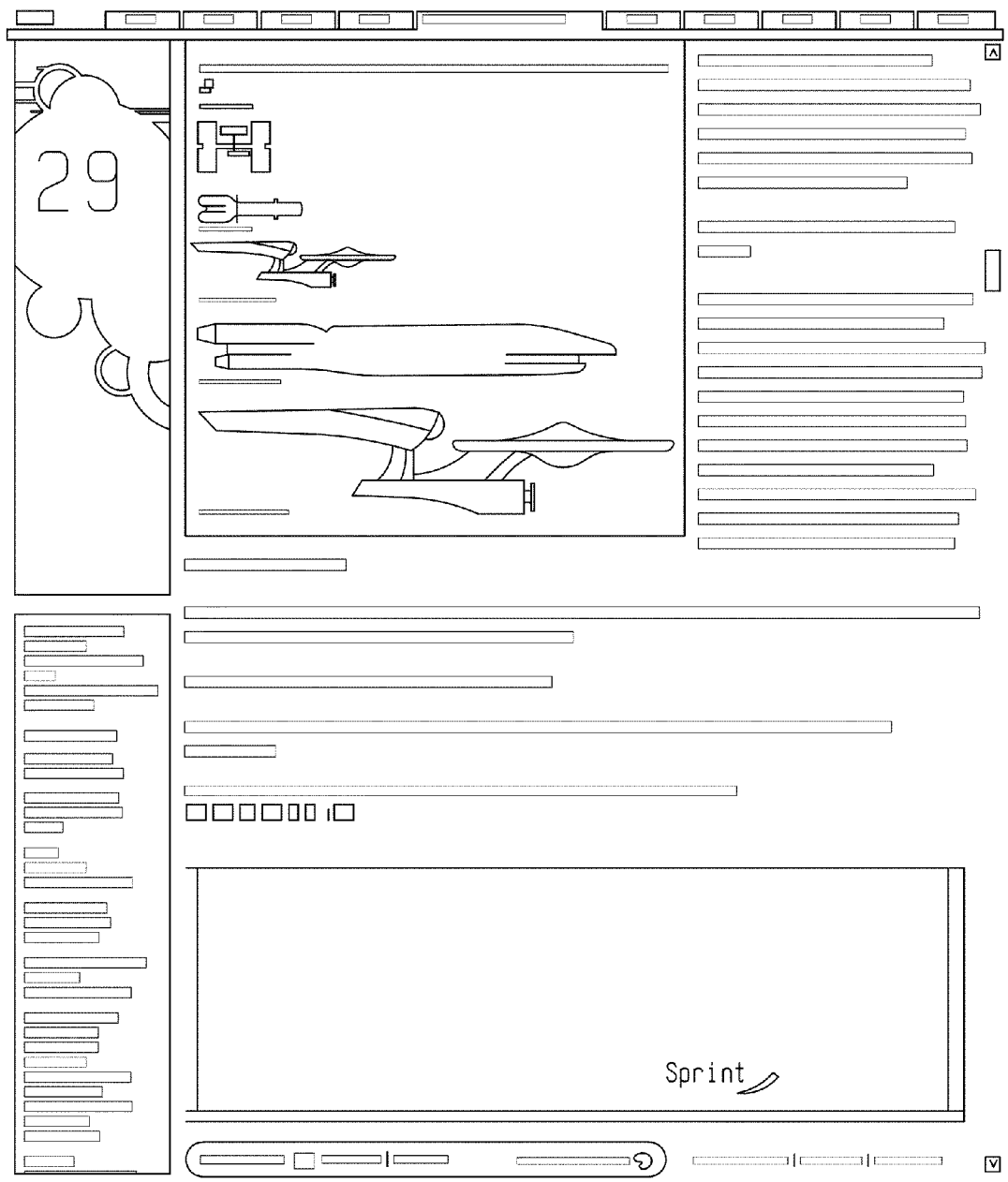
Figure 11I:
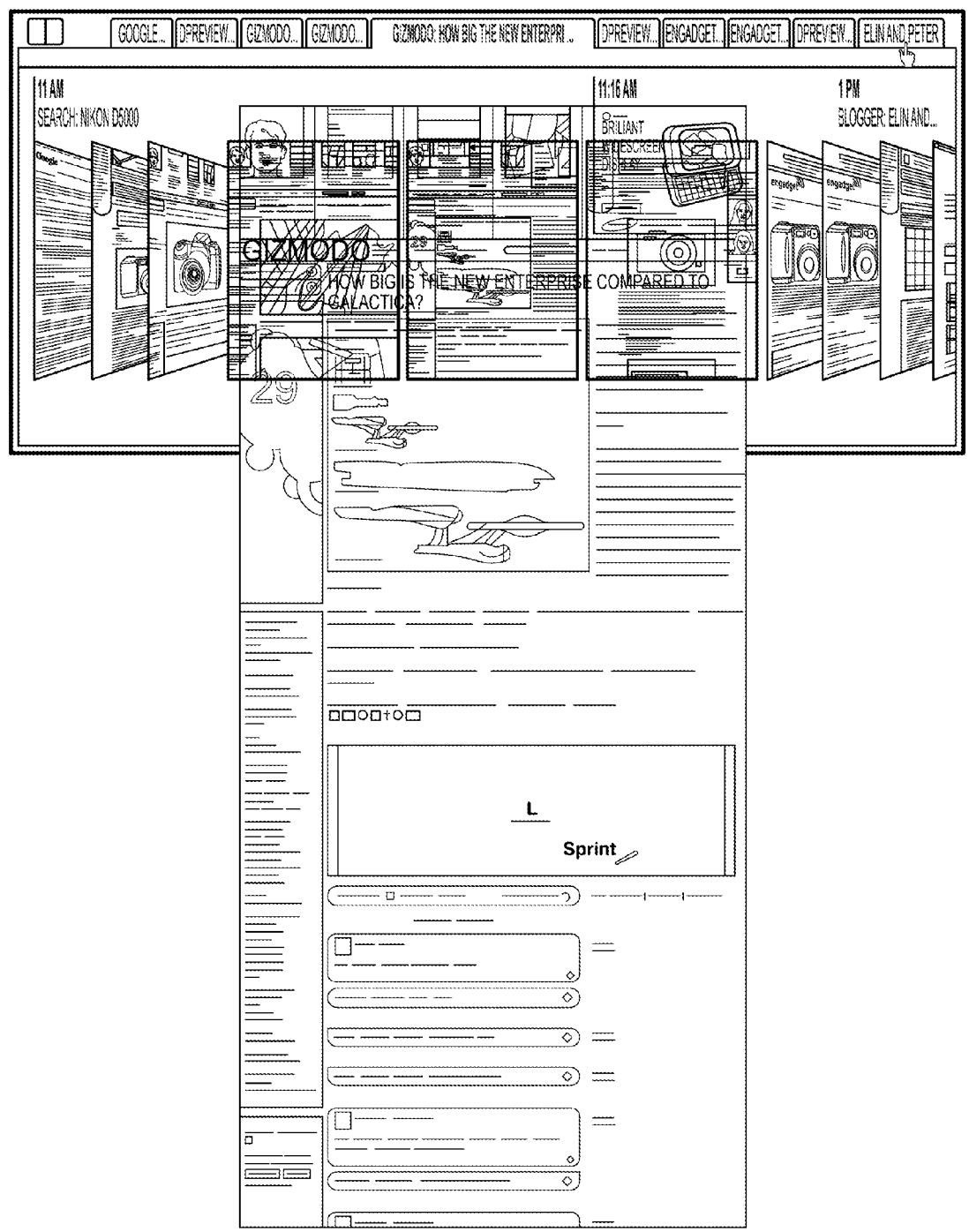

FIG. 11F shows another visualization where the central page of interest is enlarged/zoomed. Here, the time the web page was visited may be shown. In addition, this web page may partly or fully obscure the adjacent full frontal pages. And if the user selects this page for additional consideration, the page may be zoomed in to fill the screen—while still presenting the tabs on the browser bar—as shown in FIG. 11H. And FIG. 11I presents an alternative visualization wherein the content of the central page is overlayed with the three full frontal pages.

Figure 12A:
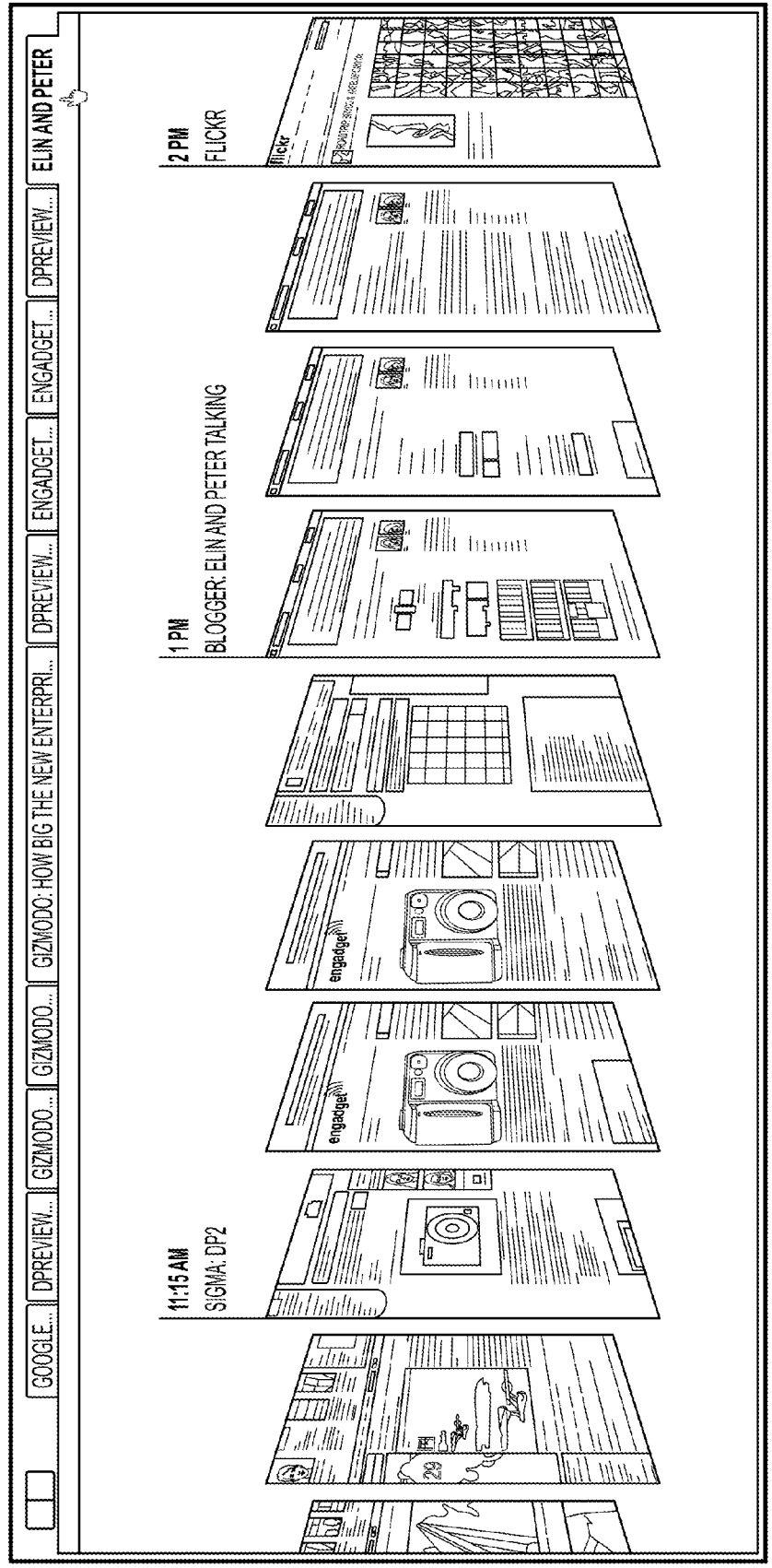
Figure 12B:
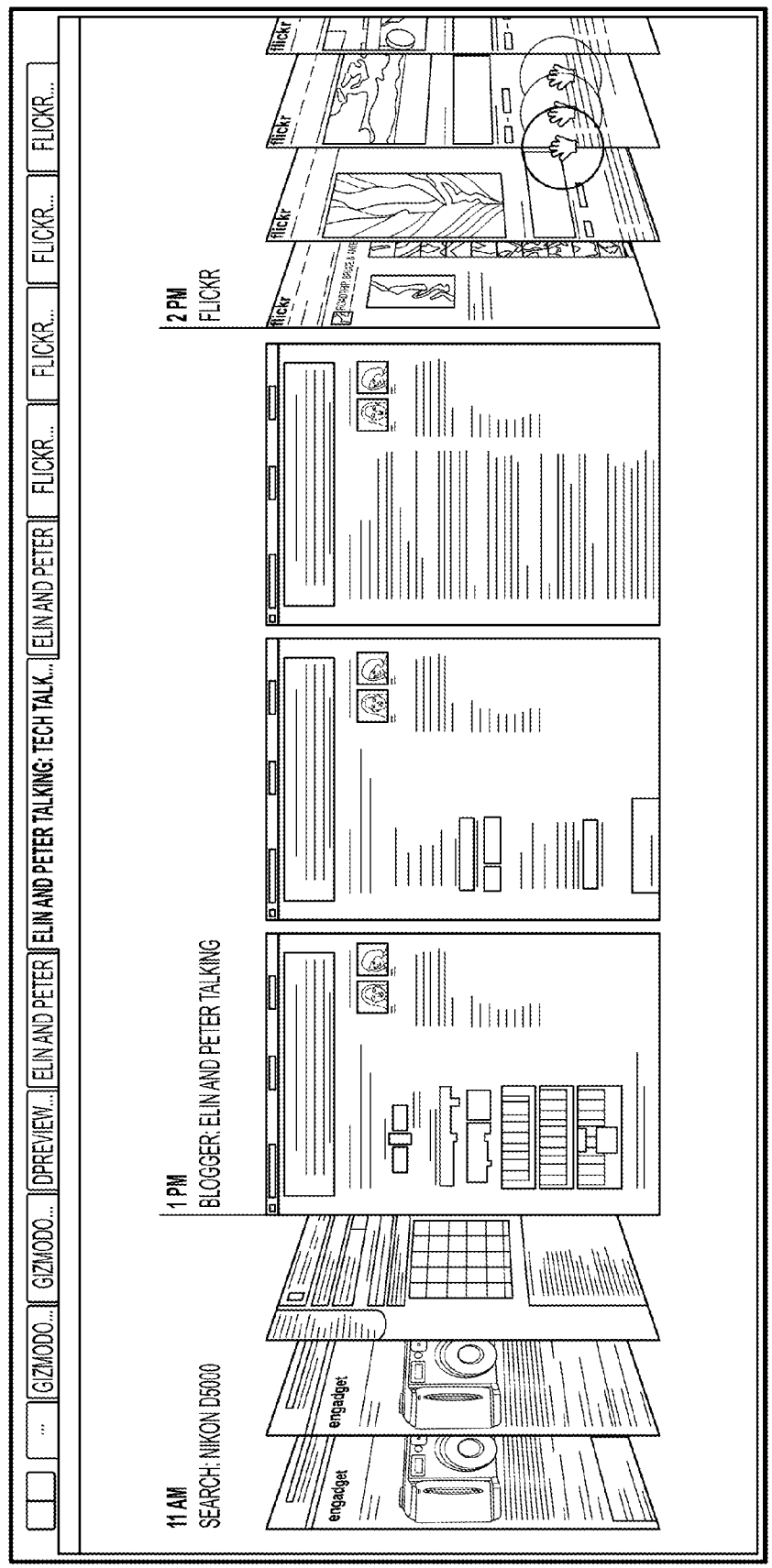
Figure 12C:
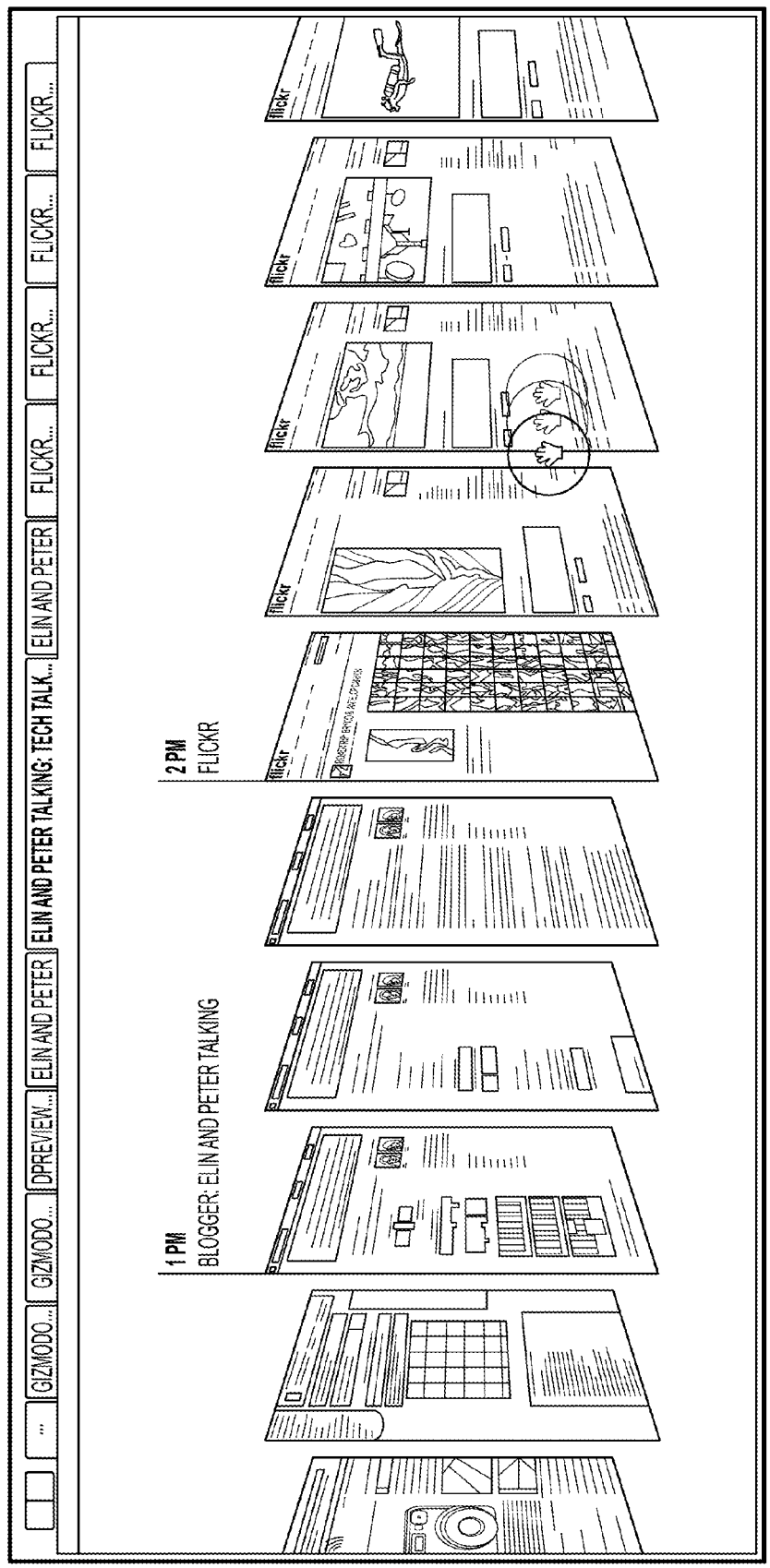
Figure 12D:
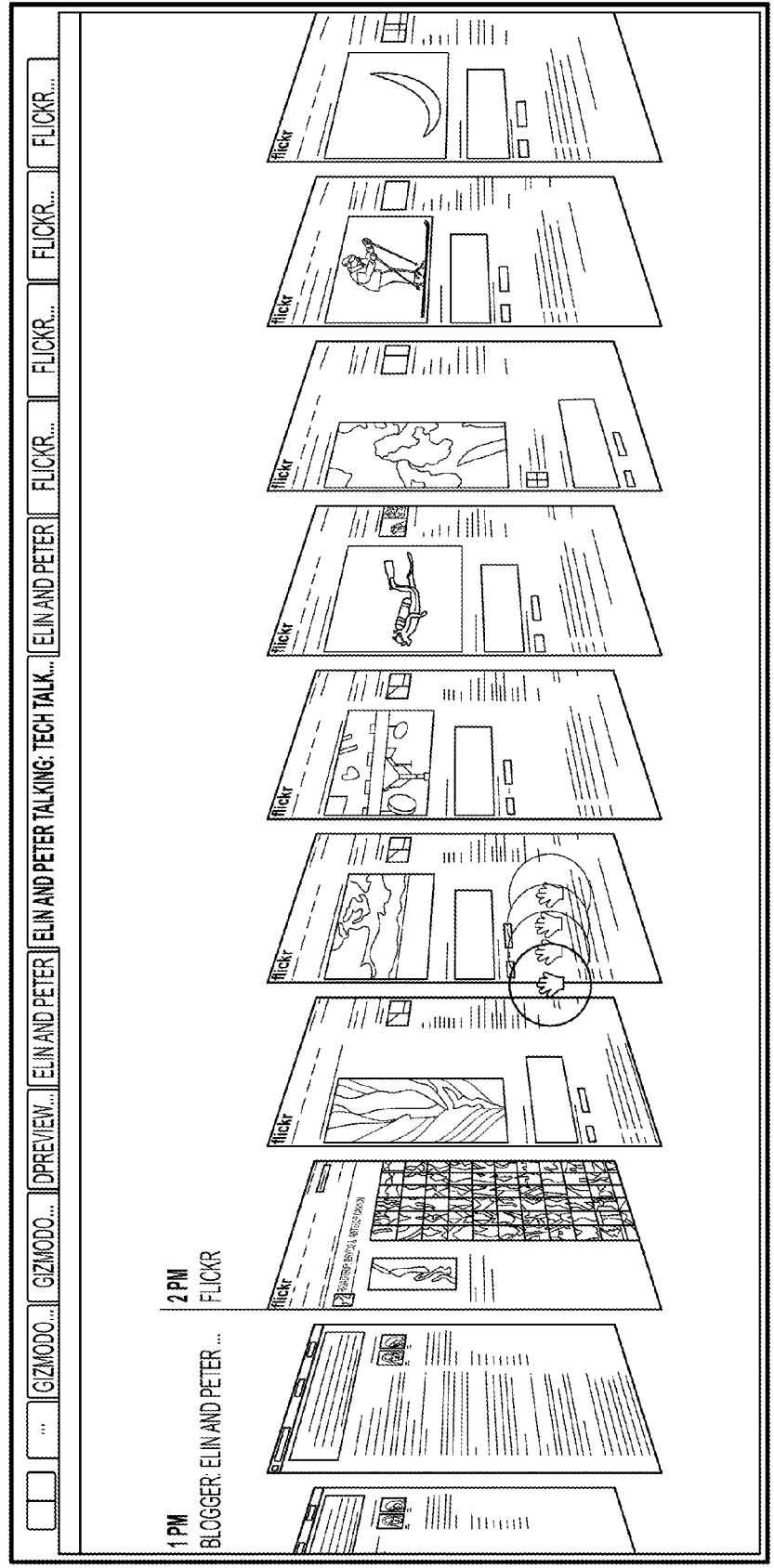
Figure 12E:
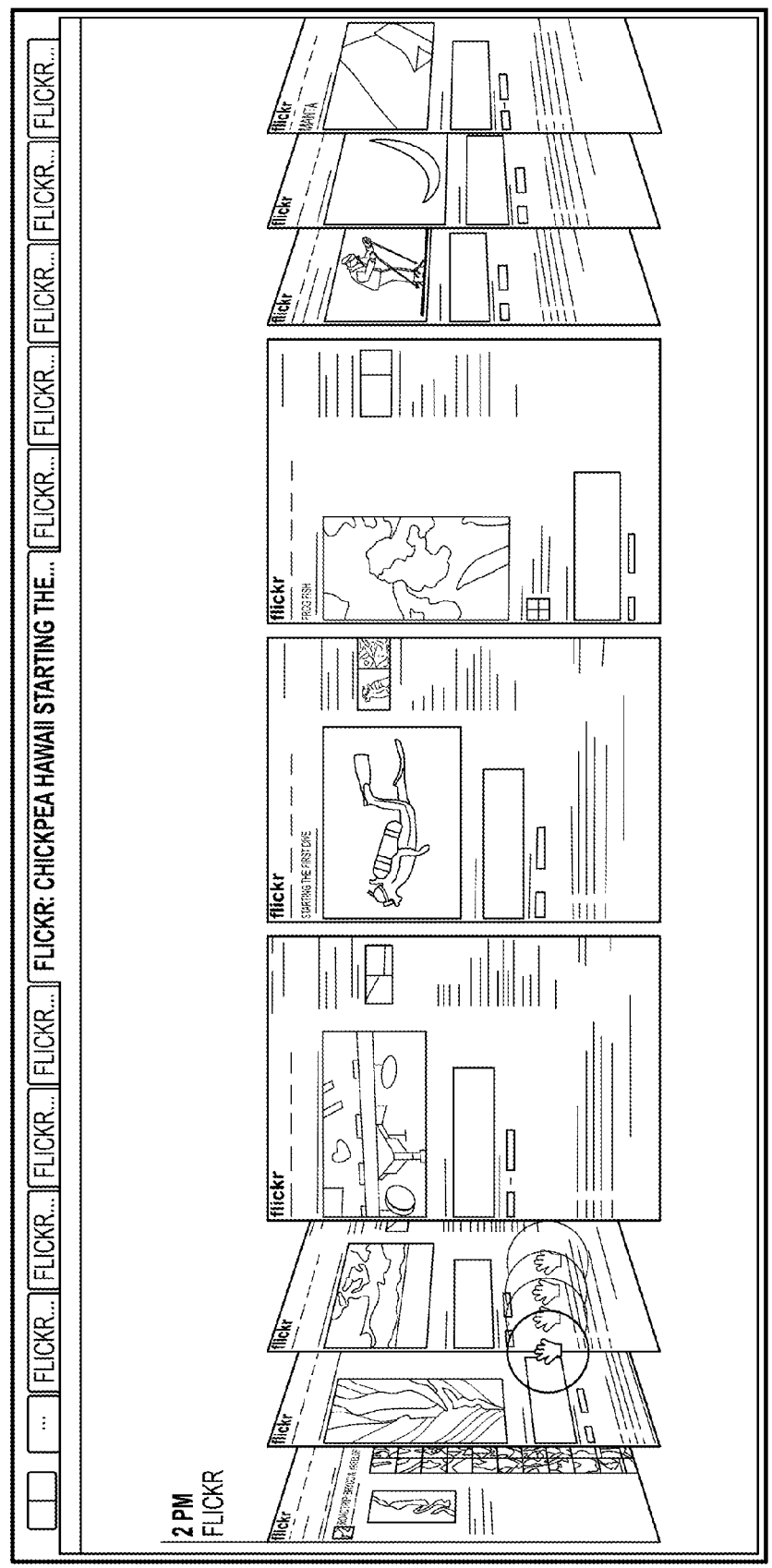
Figure 12F:
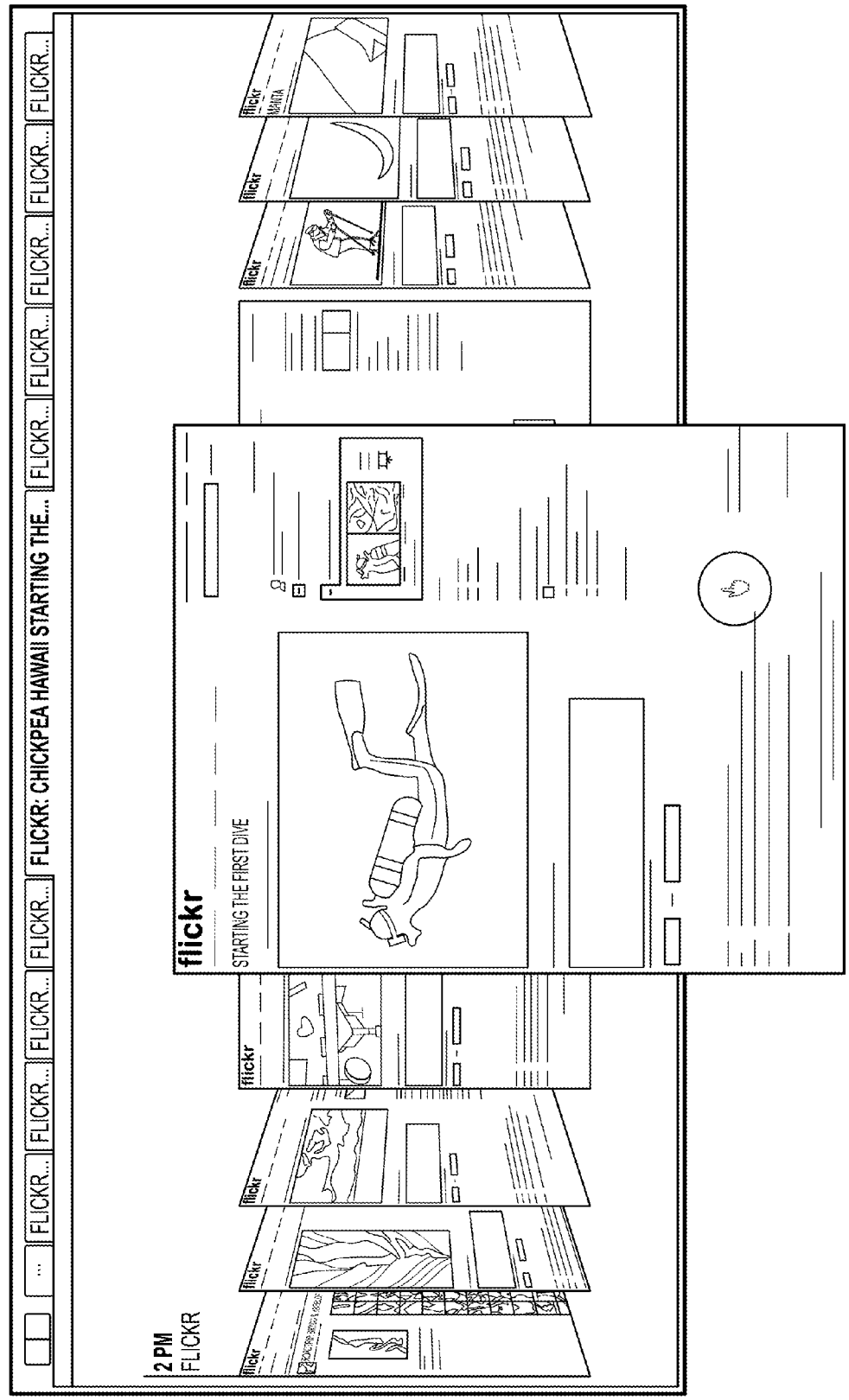

Additional tab-type visualizations are presented in FIGS. 12A-G. As shown in FIG. 12A, if the user selects a tab the page visualizations may be shown in a scrolling-type view such as with scanning through a rolodex until the content of interest is reached. Then as shown in FIG. 12B, the page associated with the selected tab may be shown in full frontal format along with the two adjacent pages. FIGS. 12C-D illustrate additional visualizations when scanning content. And FIGS. 12E-G show how selected content may be presented on the display.

Figure 13A:
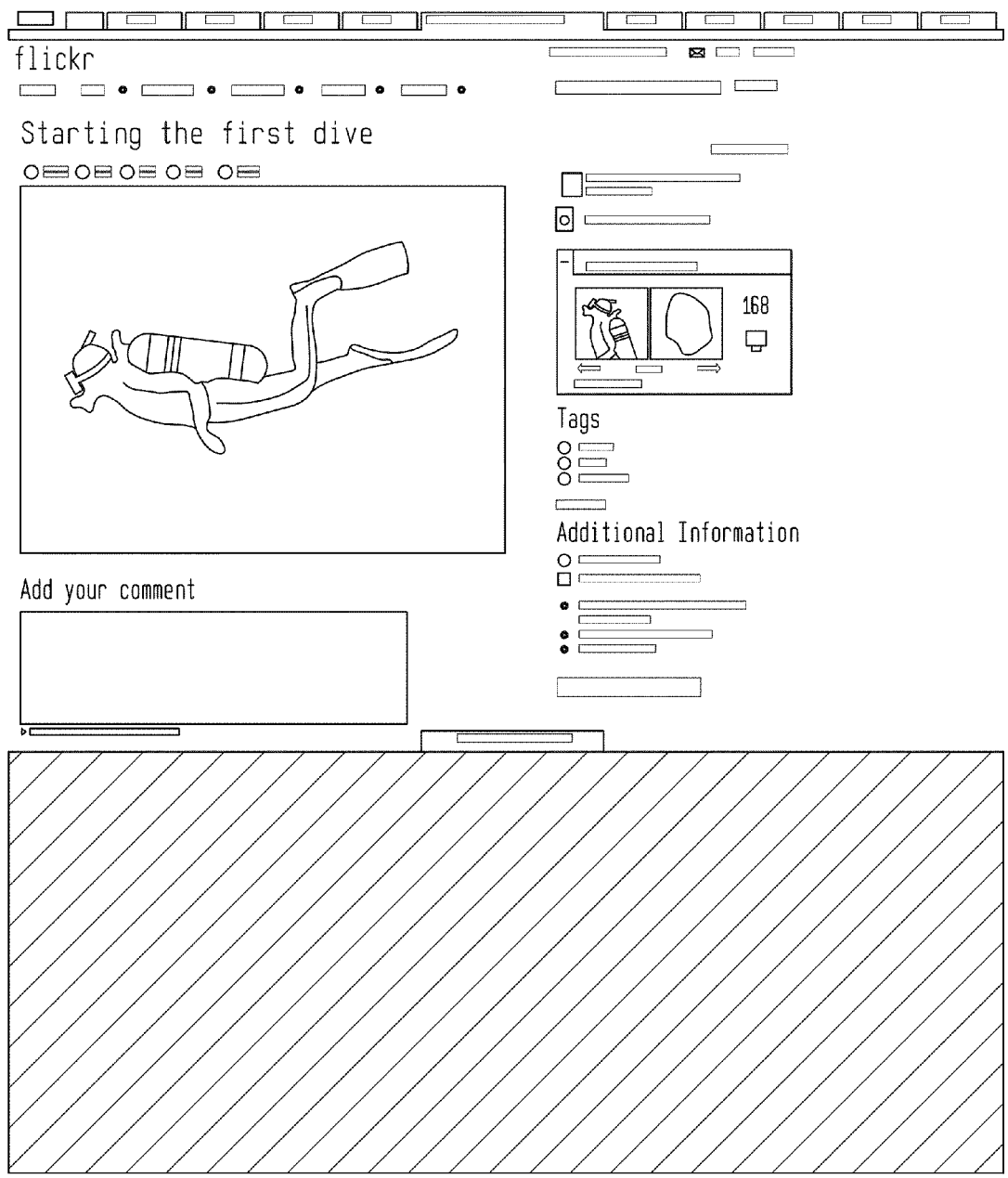
FIGS. 13A-B illustrate additional graphical user interface visualizations in accordance with aspects of the invention.
Figure 13B:
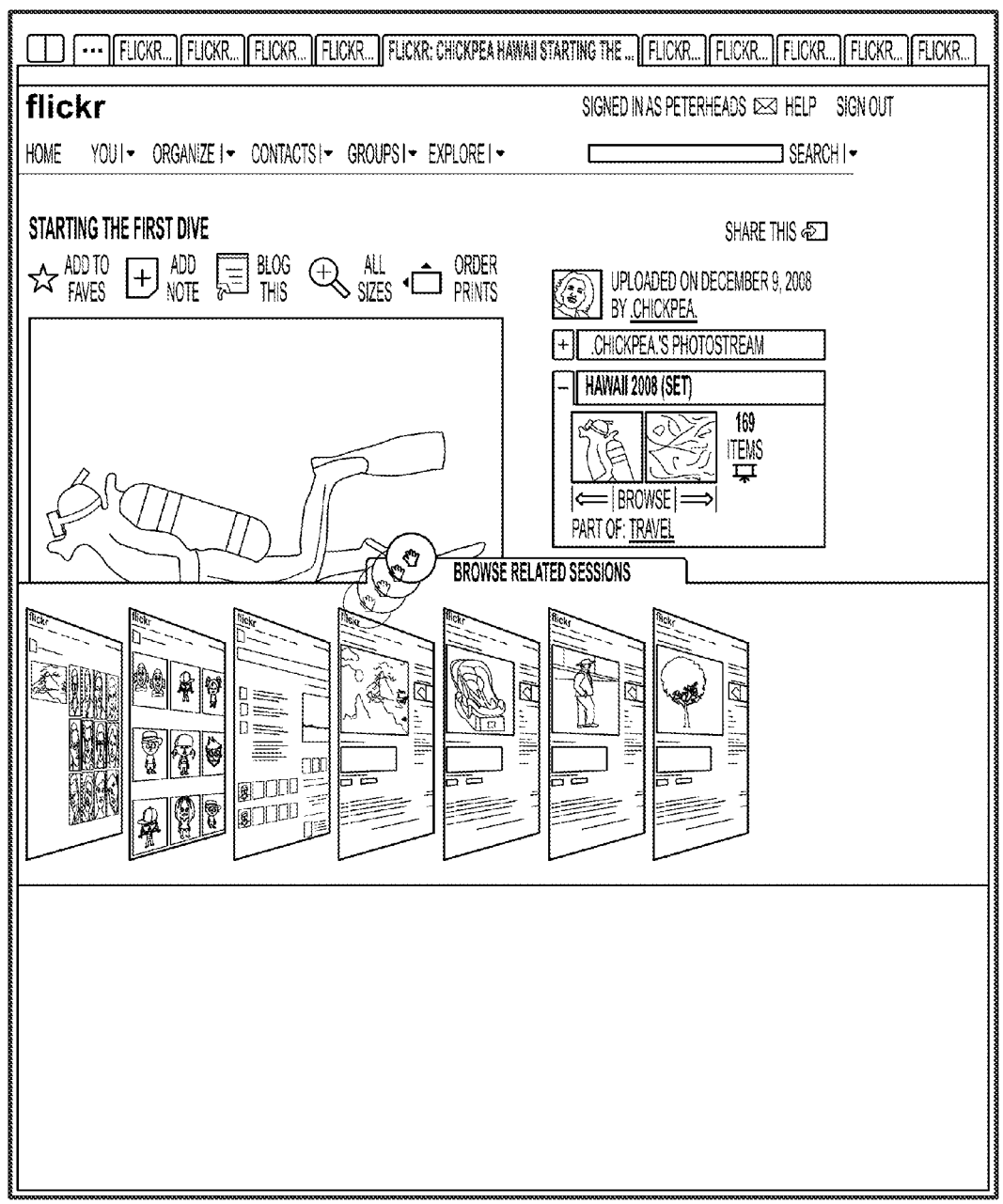

In accordance with another embodiment, visualizations may provide easy manipulation of related/recent sessions and history viewing. For instance, FIGS. 13A-B show how the user may browse related sessions. In FIG. 13A, while viewing the web page of FIG. 12G the user may be given the option to "Browse Related Sessions" as shown at the bottom. If this is selected, then related sessions may be displayed as presented in FIG. 13B. The user may then scan/access the content using any of the tools as described herein.

Figure 14A:
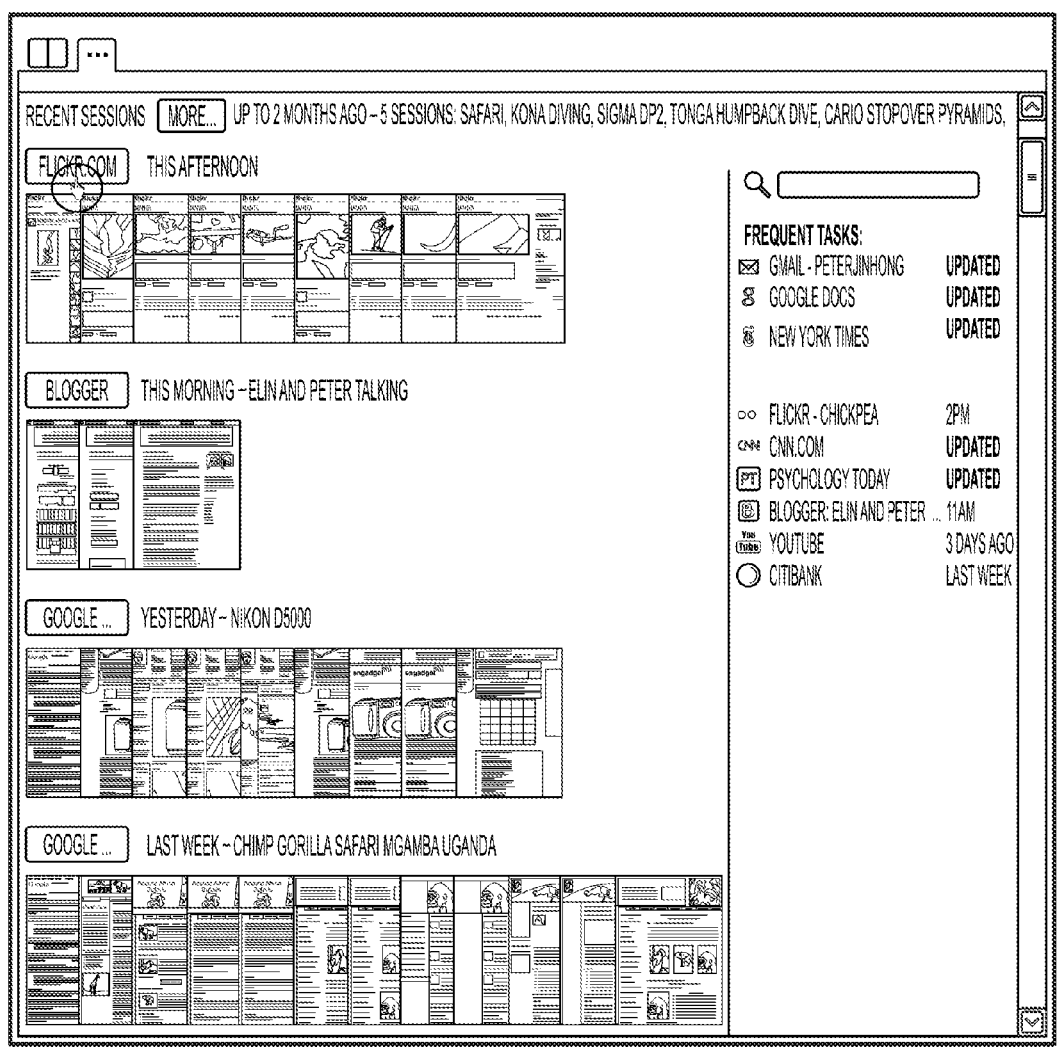
FIGS. 14A-G illustrate further graphical user interface visualizations in accordance with aspects of the invention.
Figure 14B:
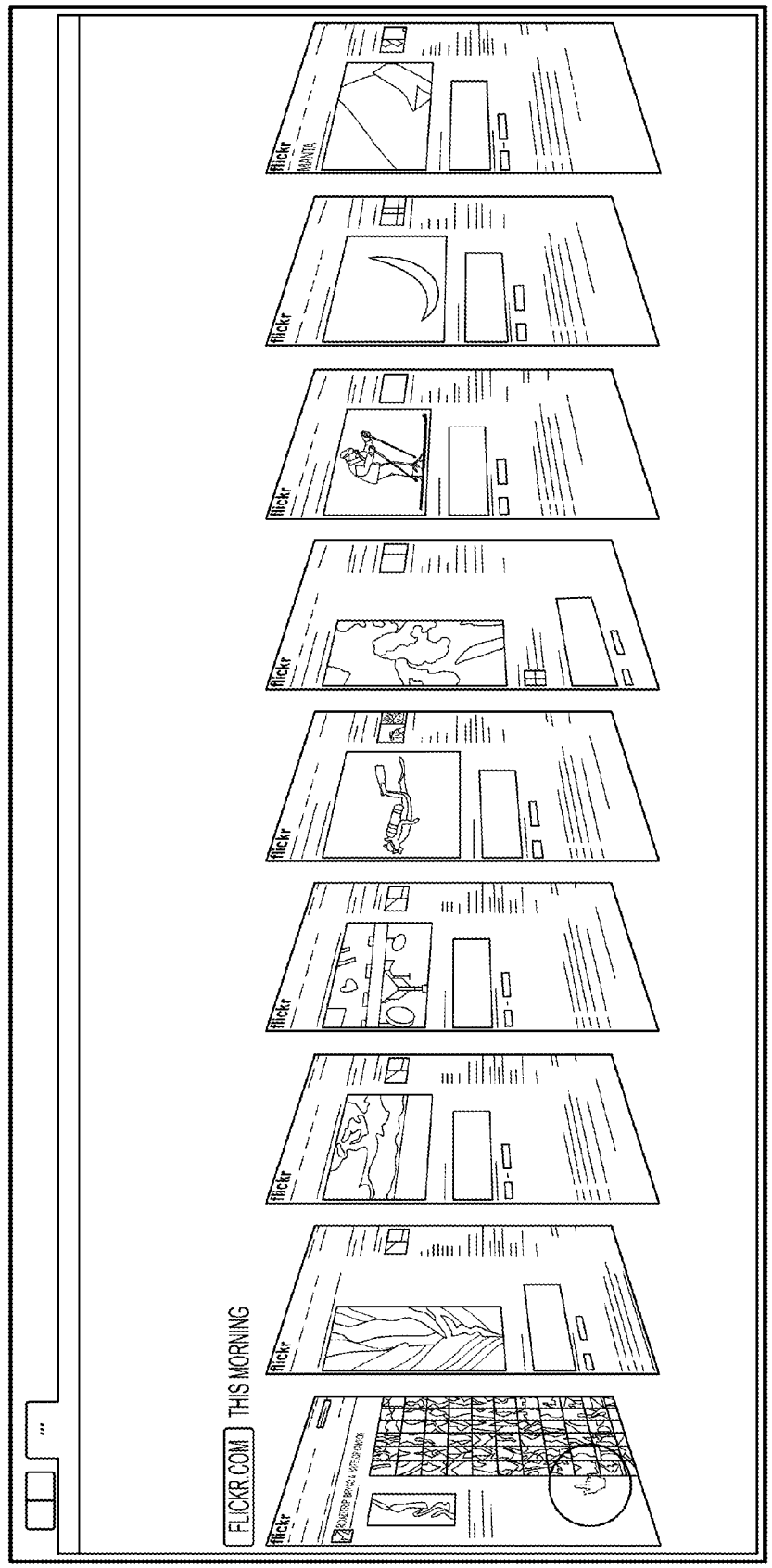
Figure 14C:
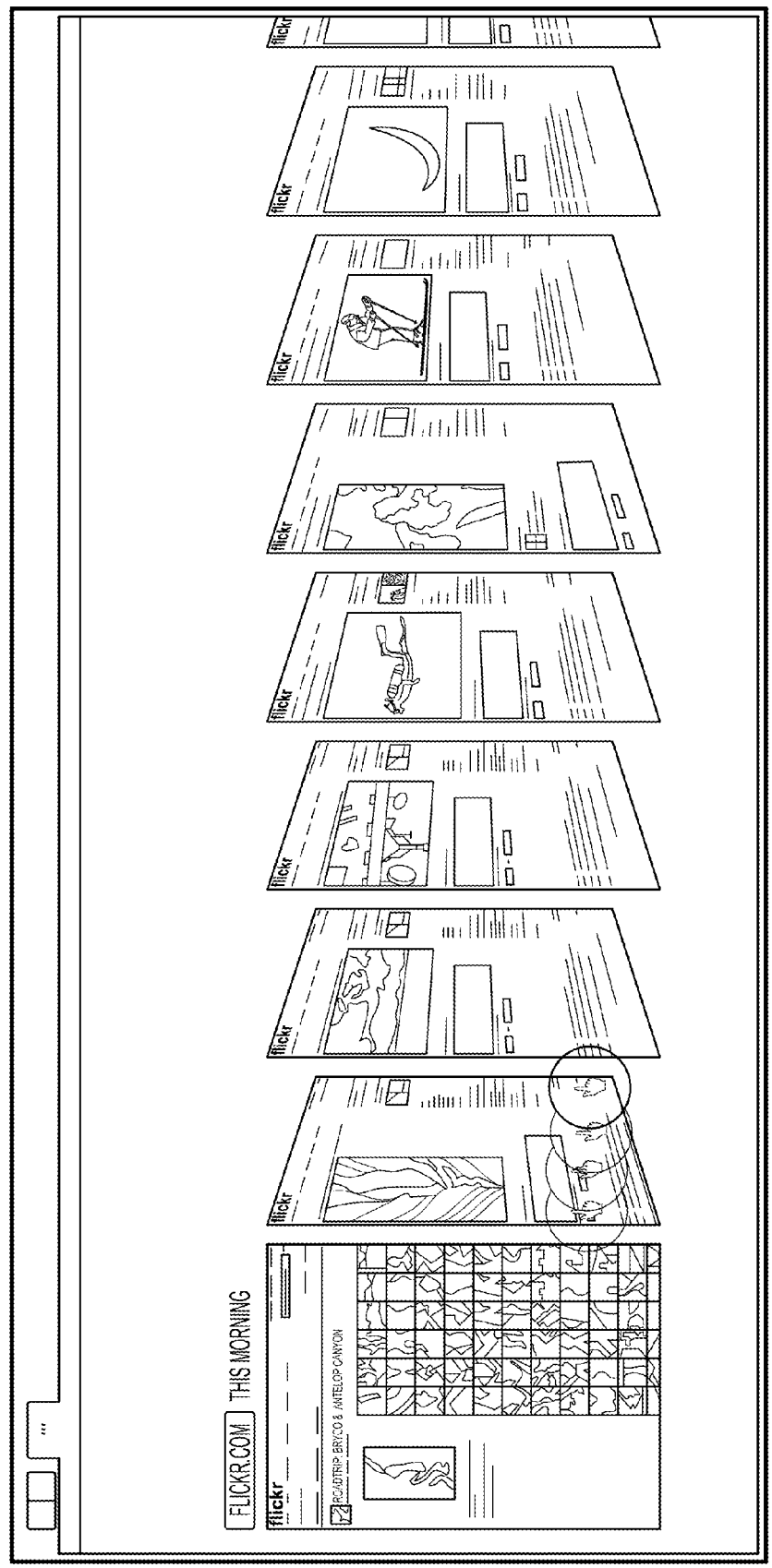
Figure 14D:
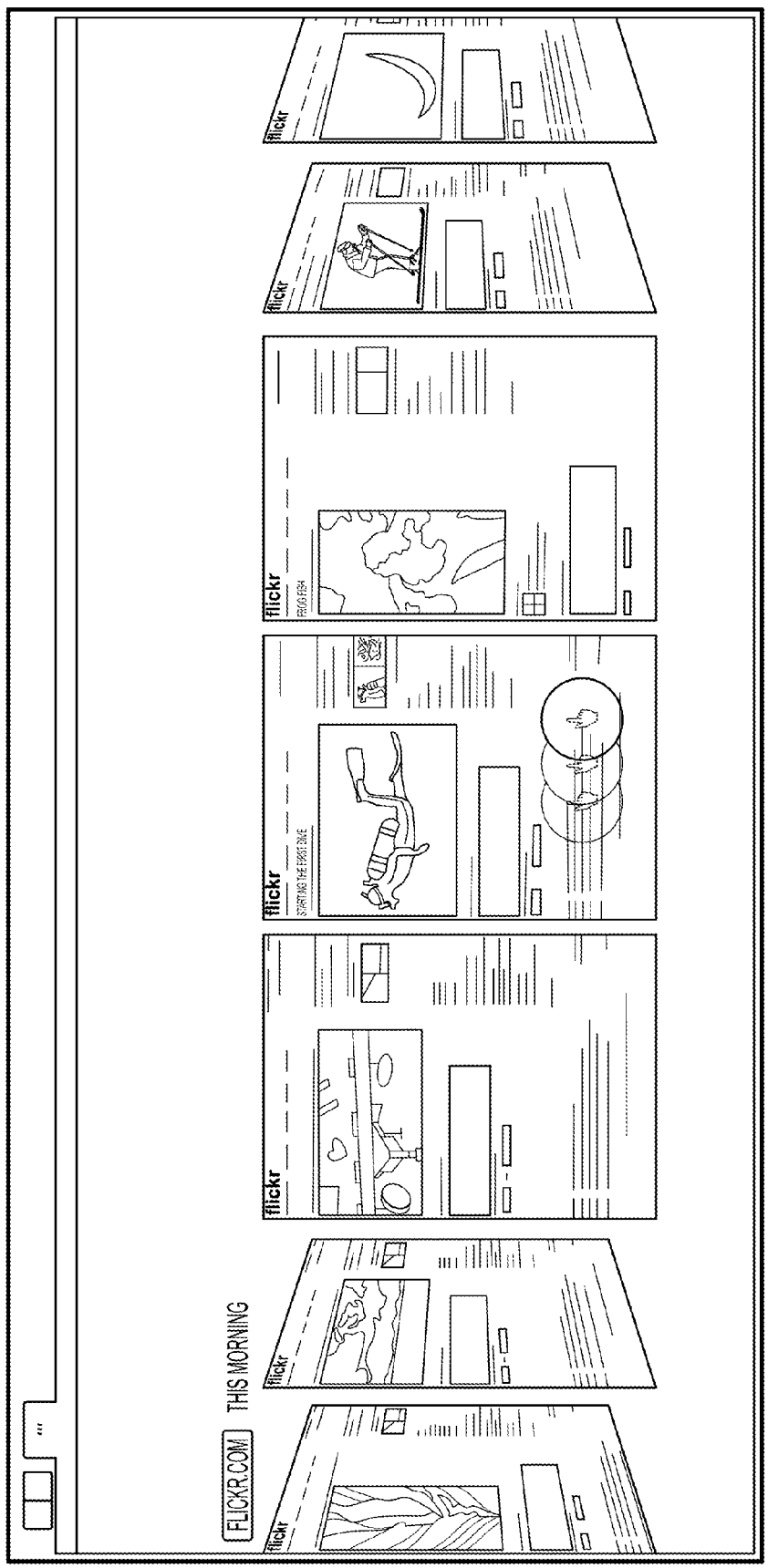
Figure 14E:
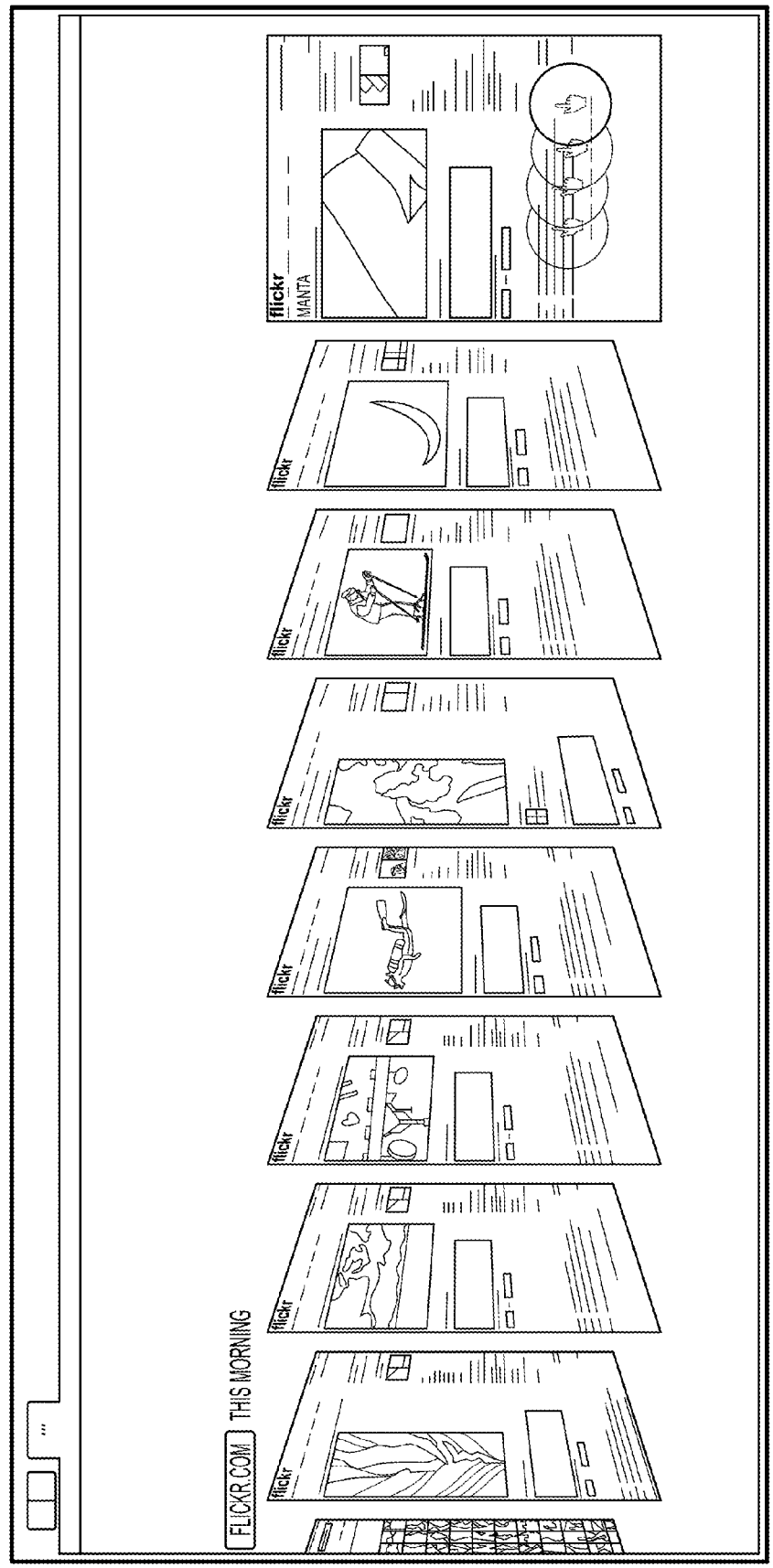
Figure 14F:
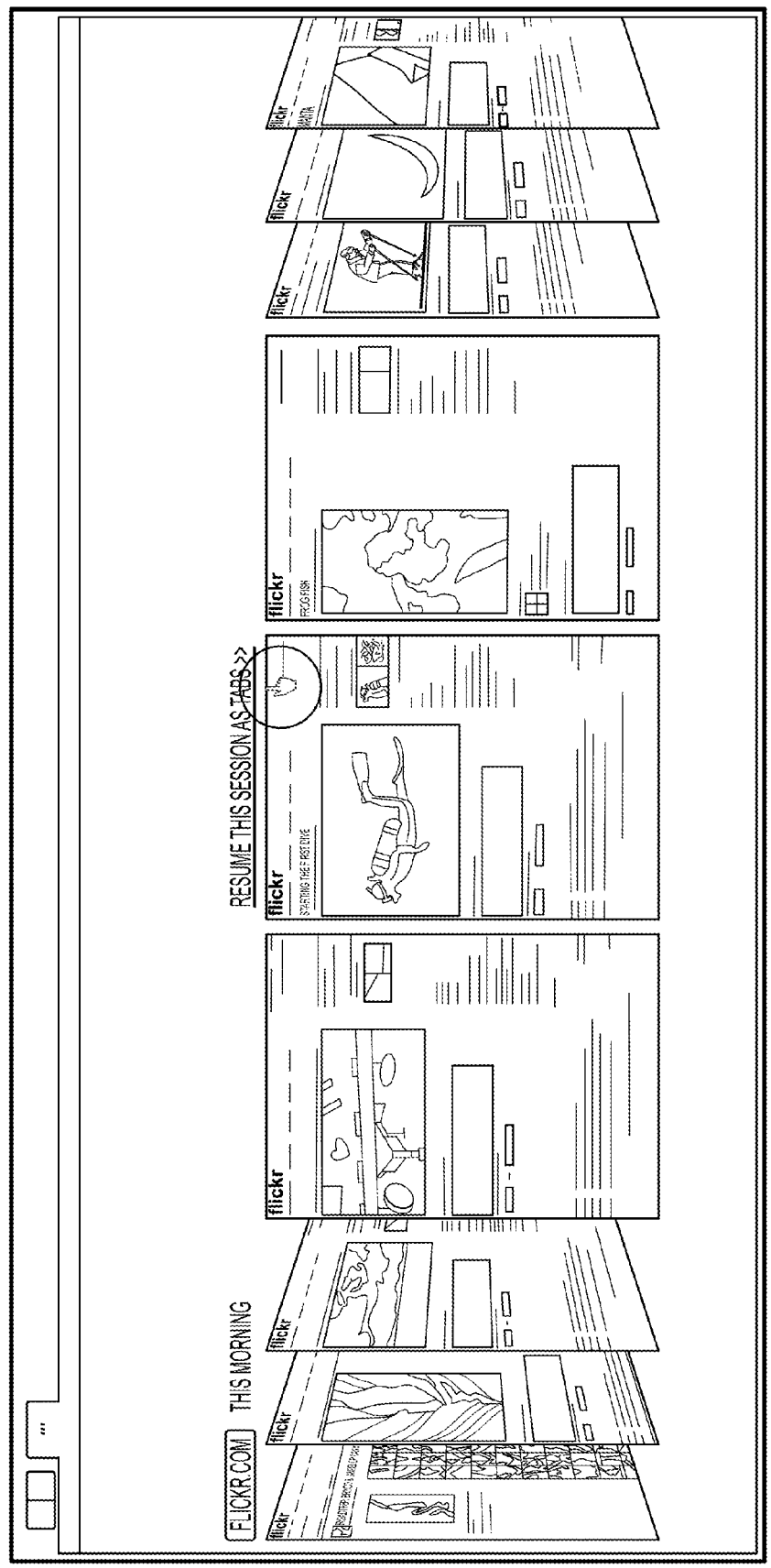
Figure 14G:
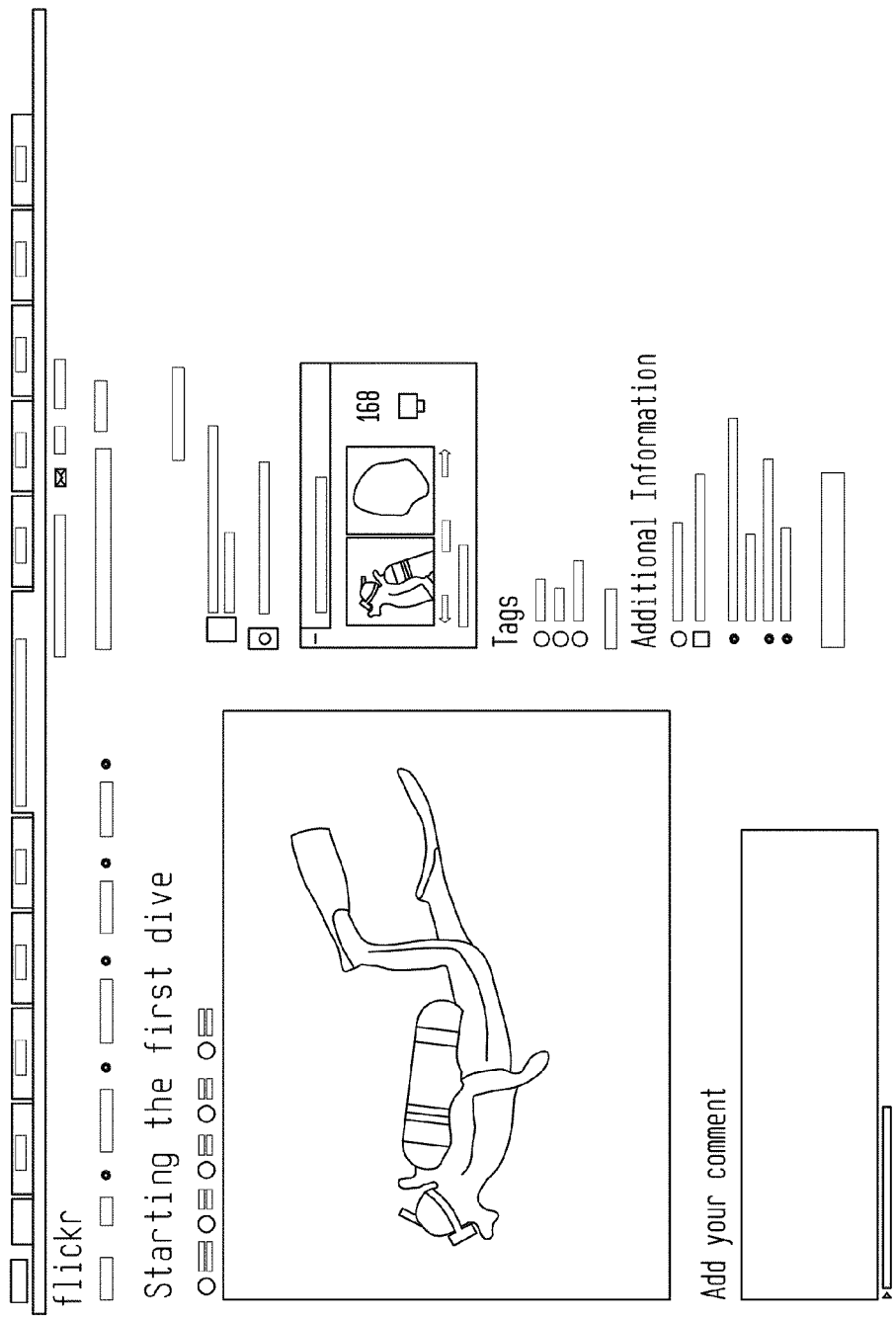
Figure 15A:
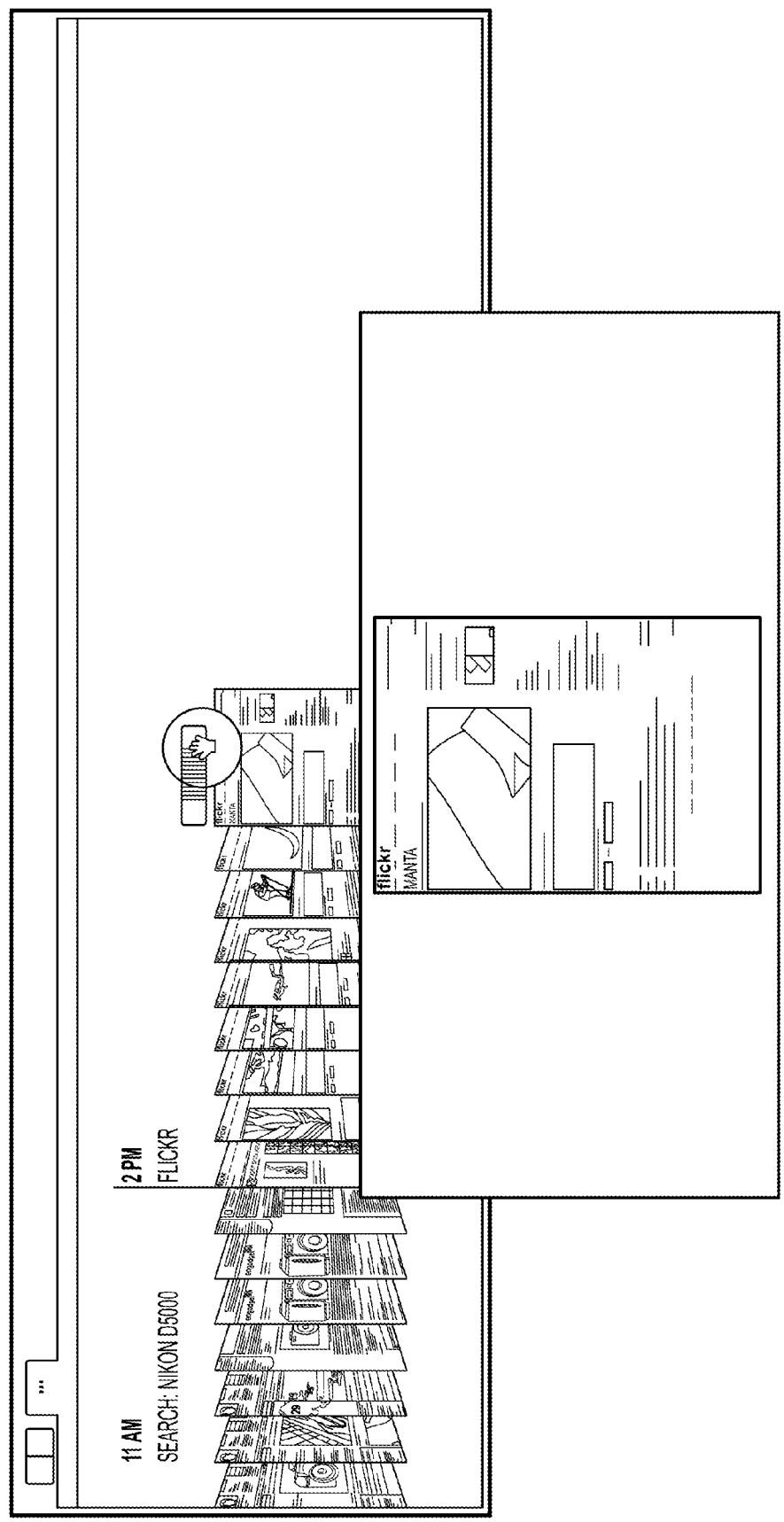
Figure 15C:
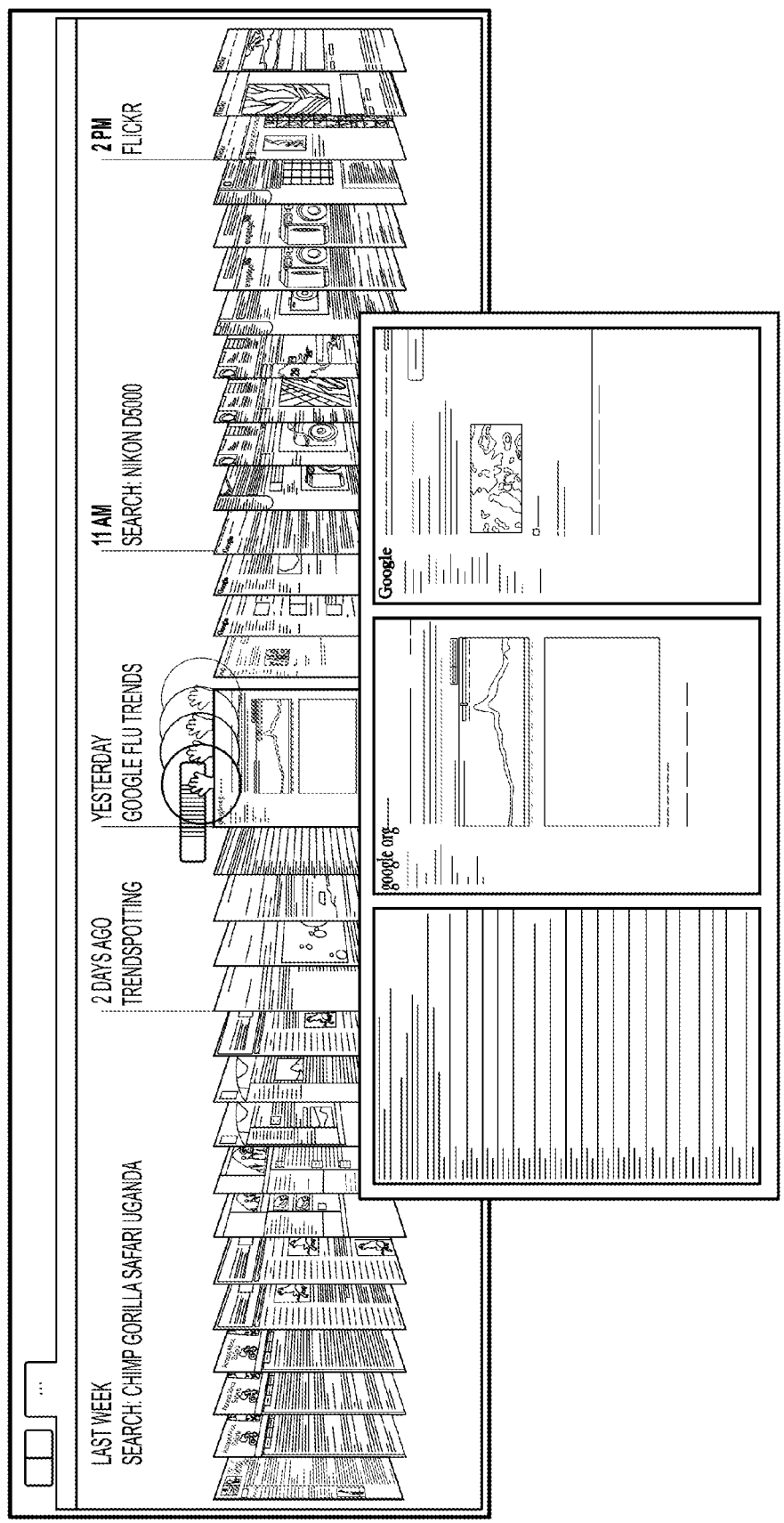
Figure 15E:
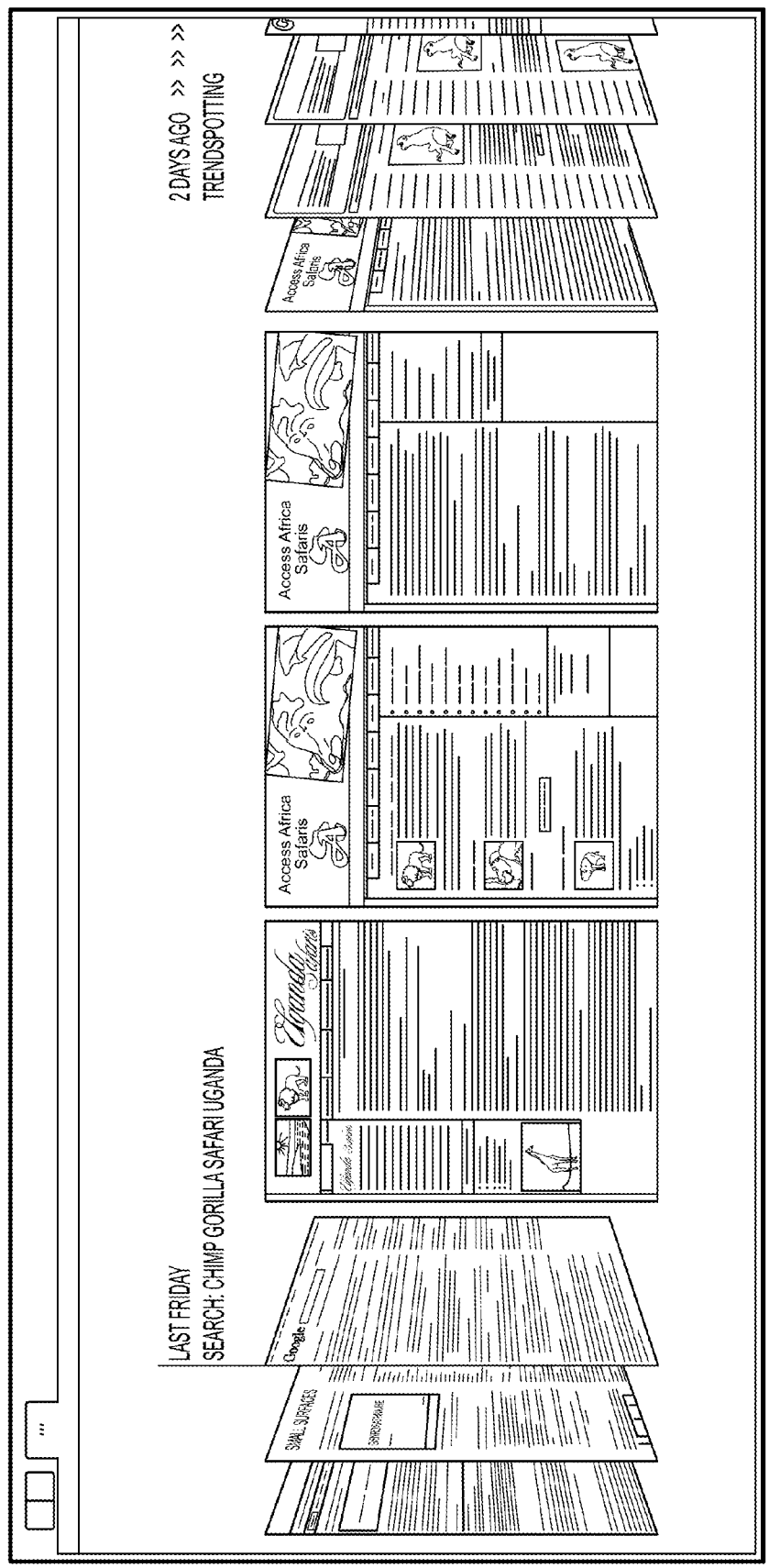

FIGS. 14A-G illustrate a further embodiment for management of recent sessions. As shown in FIG. 14A, various time-sorted sessions may be displayed, e.g., for this afternoon, this morning, yesterday and last week. As discussed above, once the user selects an item of interest, the display's visualization may change. For instance, FIGS. 14B-G illustrate changes to the visualizations based upon the user's selection(s).

In yet another embodiment, the user is able to save and resume work that was previously done. For instance, the content management section of the user interface module of FIG. 10 may keep track of previously visited web pages or other content that has been accessed. FIGS. 15A-F illustrate various visualizations using history information.

The tab browsing and other browsing features presented herein may be used in any browsing application such as a web browser, as well as other indexed search tools. This includes, but is not limited to, file manager-type applications, multimedia content applications, etc.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A content visualization method for use in a computer system, the method comprising:
    selecting electronic content for presentation on a display device;
    assigning a viewing axis for displaying the content;
    selecting a place of focus along the viewing axis;
    determining a content viewport, the content viewport setting an amount of the content viewable on the display device;
    constructing a content visualization to display at least a portion of the selected content on the display device; and
    displaying the content visualization on the display device based upon the content viewport, viewing axis and place of focus;
    wherein the content visualization includes a plurality of sets of items of interest, a first one of the sets being arranged along a first portion of the display device and a second one of the sets being arranged adjacent to the first set, and wherein the first set is presented in full frontal format while the second set is presented in a diagonal view giving an appearance that the items in the second set are facing towards the items in the first set; and
    wherein the second set includes a first subset arranged adjacent to the first set and a second subset arranged adjacent to the first subset and remote from the first set, and wherein the first subset is presented having a transitional diagonal view.

2. The content visualization method of claim 1, wherein the transitional diagonal view of the first subset is between 5°-15° and the diagonal view of the second subset is at least 15°.

3. The content visualization method of claim 1, wherein the transitional diagonal view is less than 15° and the diagonal view is on the order of 15°-45°.

4. A content visualization method for use in a computer system, the method comprising:
    selecting electronic content for presentation on a display device;
    assigning a viewing axis for displaying the content;
    selecting a place of focus along the viewing axis;
    determining a content viewport, the content viewport setting an amount of the content viewable on the display device;
    constructing a content visualization to display at least a portion of the selected content on the display device; and
    displaying the content visualization on the display device based upon the content viewport, viewing axis and place of focus;
    wherein the content visualization includes a plurality of sets of items of interest, a first one of the sets being arranged along a first portion of the display device and a second one of the sets being arranged adjacent to the first set, and wherein the first set is presented in full frontal format while the second set is presented in a diagonal view giving an appearance that the items in the second set are facing towards the items in the first set; and
    wherein a third one of the plurality of sets is arranged adjacent to the first set and opposite the second set, the third set being presented in the diagonal view giving the appearance that the items in the third set are facing away from the items in the first set.

5. The content visualization method of claim 4, wherein the third set includes a first subset arranged adjacent to the first set and a second subset arranged adjacent to the first subset of the third set and remote from the first set, and wherein the first subset of the third set is presented having a transitional diagonal view.

6. A content visualization apparatus, comprising:
    memory for storing content visualization data;
    a processor operatively coupled to the memory, the processor being configured to:
        select electronic content for presentation,
        assign a viewing axis for displaying the content,
        select a place of focus along the viewing axis,
        determine a content viewport, the content viewport setting an amount of the content that is viewable, and
        construct a content visualization to display at least a portion of the selected content on the display device; and
    a display device operatively coupled to the processor, the display device being configured to display the content visualization based upon the content viewport, viewing axis and place of focus;
    wherein the content visualization includes a plurality of sets of items of interest, a first one of the sets being arranged along a first portion of the display device and a second one of the sets being arranged adjacent to the first set, and wherein the display device is configured to present the first set in full frontal format while the second set is presented in a diagonal view giving an appearance that the items in the second set are facing towards the items in the first set;
    wherein the second set includes a first subset arranged adjacent to the first set and a second subset arranged adjacent to the first subset and remote from the first set, and wherein the display device is configured to present the first subset having a transitional diagonal view.

7. A content visualization system, comprising:
    a processor for processing application data for displaying on a display device; and
    a user interface module managed by the processor, the user interface module including:
        an input section for storing selected content;
        a content management section for manipulating visualizations of the selected content, the selected content including a plurality of items of interest, and a given one of the visualizations includes a first one of the items of interest being arranged in full frontal format and second and third ones of the items of interest being arranged in a diagonal view, the second item being arranged in the diagonal view along one side of the first item and the third item being arranged in the diagonal view along the other side of the first item; and
        a display section for displaying the given visualization of the first, second and third items of interest on a display;
        wherein at least one of the second and third items includes a plurality of pages, the diagonal view includes a full diagonal view and a transitional diagonal view, and a first one of the plurality of pages is arranged in the full diagonal view while a second one of the plurality of pages is arranged in the transitional diagonal view between the first item and the first page.

* * * * *